United States Patent
Tanaka

(10) Patent No.: US 8,730,360 B2
(45) Date of Patent: May 20, 2014

(54) COLOR IMAGING APPARATUS HAVING COLOR IMAGING ELEMENT, METHOD OF CONTROLLING OPERATION OF SAME AND IMAGE SENSING SYSTEM

(71) Applicant: FUJIIFLM Corporation, Tokyo (JP)

(72) Inventor: Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/930,585

(22) Filed: Jun. 28, 2013

(65) Prior Publication Data

US 2013/0293750 A1  Nov. 7, 2013

Related U.S. Application Data

(63) Continuation of application No. PCT/JP2011/067919, filed on Jul. 29, 2011.

(30) Foreign Application Priority Data

Mar. 11, 2011 (JP) .................................. 2011-054684
Jul. 25, 2011 (JP) .................................. 2011-162215

(51) Int. Cl.
*H04N 9/083* (2006.01)
*H01L 21/00* (2006.01)

(52) U.S. Cl.
USPC ............................................ 348/280; 438/70

(58) Field of Classification Search
USPC ...................................... 348/273, 280; 438/70
See application file for complete search history.

(56) References Cited

U.S. PATENT DOCUMENTS

| 5,847,758 | A  | * | 12/1998 | Iizuka ........................... 348/317 |
| 6,882,365 | B1 |   | 4/2005  | Aoki |
| 6,995,796 | B2 |   | 2/2006  | Taubman |
| 7,268,813 | B2 | * | 9/2007  | Murata et al. .................. 348/274 |
| 7,932,944 | B2 | * | 4/2011  | Tanaka et al. .................. 348/280 |
| 8,085,323 | B2 | * | 12/2011 | Tanaka et al. .................. 348/254 |
| 8,456,553 | B2 | * | 6/2013  | Hayashi et al. ................ 348/273 |
| 2002/0149686 | A1 |   | 10/2002 | Taubman |
| 2004/0109068 | A1 |   | 6/2004  | Mitsunaga et al. |
| 2004/0169747 | A1 |   | 9/2004  | Ono et al. |

(Continued)

FOREIGN PATENT DOCUMENTS

| JP | 8-23542 A | 1/1996 |
| JP | 8-23543 A | 1/1996 |

(Continued)

OTHER PUBLICATIONS

International Search Report for PCT/JP2011/067919 dated Oct. 25, 2011.

(Continued)

*Primary Examiner* — John Villecco
(74) *Attorney, Agent, or Firm* — Birch, Stewart, Kolasch & Birch, LLP

(57) ABSTRACT

When a central pixel having a red component is generated by interpolation, mixing is performed using red-component pixels lying along the diagonal directions thereof. When a central pixel having a green component is generated by interpolation, mixing is performed using green-component pixels located above, below and to the left and right thereof. When a central pixel having a blue component is generated by interpolation, no mixing processing is executed. A reduction in image size is performed at the same time as pixel interpolation.

7 Claims, 26 Drawing Sheets

(56) References Cited

U.S. PATENT DOCUMENTS

| | | |
|---|---|---|
| 2006/0012841 A1 | 1/2006 | Tsukioka |
| 2006/0203113 A1 | 9/2006 | Wada et al. |
| 2007/0013786 A1 | 1/2007 | Chiba et al. |
| 2007/0153104 A1 | 7/2007 | Ellis-Monaghan et al. |
| 2008/0151083 A1 | 6/2008 | Hains et al. |
| 2011/0069189 A1 | 3/2011 | Venkataraman et al. |
| 2011/0199520 A1* | 8/2011 | Katou ............................ 348/280 |
| 2012/0025060 A1 | 2/2012 | Iwata |
| 2012/0293695 A1* | 11/2012 | Tanaka .......................... 348/280 |
| 2012/0293696 A1* | 11/2012 | Tanaka .......................... 348/280 |
| 2013/0050546 A1* | 2/2013 | Kano ............................ 348/280 |

FOREIGN PATENT DOCUMENTS

| | | |
|---|---|---|
| JP | 11-285012 A | 10/1999 |
| JP | 2000-23174 A | 1/2000 |
| JP | 2000-308080 A | 11/2000 |
| JP | 2004-221839 A | 8/2004 |
| JP | 2004-266369 A | 9/2004 |
| JP | 2005-136766 A | 5/2005 |
| JP | 2007-37104 A | 2/2007 |
| JP | 2007-184904 A | 7/2007 |
| JP | 2007-306490 A | 11/2007 |
| JP | 2008-236620 A | 10/2008 |
| JP | 4350706 B2 | 10/2009 |
| JP | 2010-512048 A | 4/2010 |
| JP | 2010-153511 A | 7/2010 |
| JP | 2011-523538 A | 8/2011 |
| WO | WO 02/056604 A1 | 7/2002 |
| WO | WO 2008/066698 A2 | 6/2008 |
| WO | WO 2009/151903 A2 | 12/2009 |

OTHER PUBLICATIONS

Written Opinion of the International Searching Authority for PCT/JP2011/067919 dated Oct. 25, 2011.

English translation of the Chinese Office Action for Chinese Application No. 201180022503.3, issued May 23, 2013.

International Search Report and Written Opinion of the International Searching Authority for International Applicaiton No. PCT/JP2012/080898 (Forms PCT/ISA/210 and PCT/ISA/237) with partial English translation, dated Jan. 22, 2013.

International Search Report and Written Opinion of the International Searching Authority for International Applicaiton No. PCT/JP2012/080899 (Forms PCT/ISA/210 and PCT/ISA/237) with partial English translation, mailed Jan. 15, 2013.

International Search Report and Written Opinion of the International Searching Authority for International Applicaiton No. PCT/JP2012/081644 (Forms PCT/ISA/210 and PCT/ISA/237) with partial English translation, mailed Jan. 15, 2013.

International Search Report and Written Opinion of the International Searching Authority for International Applicaiton No. PCT/JP2012/083583 (Forms PCT/ISA/210 and PCT/ISA/237) with partial English translation, mailed Jan. 29, 2013.

* cited by examiner

*Fig. 3a*  *Fig. 3b*  *Fig. 3c*
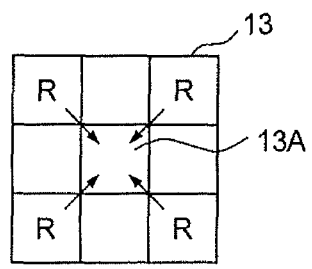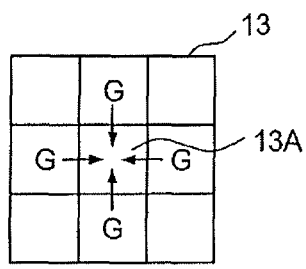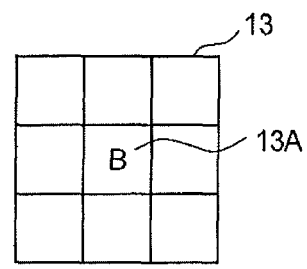

*Fig. 9a*     *Fig. 9b*     *Fig. 9c*
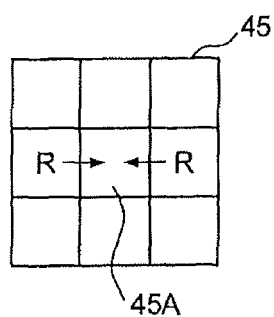
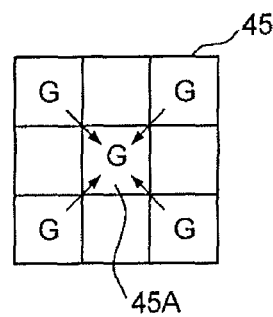
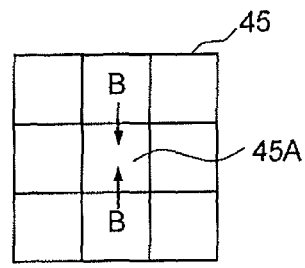

*Fig. 10a*        *Fig. 10b*        *Fig. 10c*
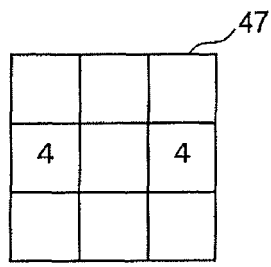 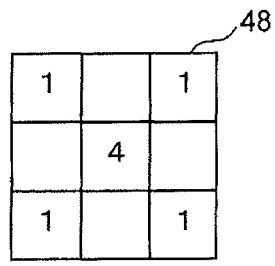 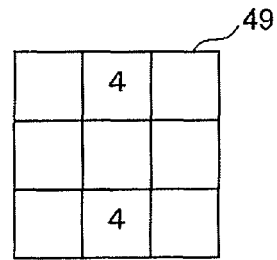

*Fig. 15*

| G(1) | B(4) | G(1) | G(2) | R(8) | G(2) | G(1) | B(4) | G(1) |
|------|------|------|------|------|------|------|------|------|
| R(4) | G(4) | R(4) | B(8) | G(8) | B(8) | R(4) | G(4) | R(4) |
| G(1) | B(4) | G(1) | G(2) | R(8) | G(2) | G(1) | B(4) | G(1) |
| G(2) | R(8) | G(2) | G(4) | B(16)| G(4) | G(2) | R(8) | G(2) |
| B(8) | G(8) | B(8) | R(16)| G(16)| R(16)| B(8) | G(8) | B(8) |
| G(2) | R(8) | G(2) | G(4) | B(16)| G(4) | G(2) | R(8) | G(2) |
| G(1) | B(4) | G(1) | G(2) | R(8) | G(2) | G(1) | B(4) | G(1) |
| R(4) | G(4) | R(4) | B(8) | G(8) | B(8) | R(4) | G(4) | R(4) |
| G(1) | B(4) | G(1) | G(2) | R(8) | G(2) | G(1) | B(4) | G(1) |

*Fig. 21*

| B(1) | G(1) | B(1) | R(2) | G(2) | R(2) | B(1) | G(1) | B(1) |
|------|------|------|------|------|------|------|------|------|
| G(1) | R(4) | G(1) | G(2) | B(8) | G(2) | G(1) | R(4) | G(1) |
| B(1) | G(1) | B(1) | R(2) | G(2) | R(2) | B(1) | G(1) | B(1) |
| R(2) | G(2) | R(2) | B(4) | G(4) | B(4) | R(2) | G(2) | R(2) |
| G(2) | B(8) | G(2) | G(4) | R(16)| G(4) | G(2) | B(8) | G(2) |
| R(2) | G(2) | R(2) | B(4) | G(4) | B(4) | R(2) | G(2) | R(2) |
| B(1) | G(1) | B(1) | R(2) | G(2) | R(2) | B(1) | G(1) | B(1) |
| G(1) | R(4) | G(1) | G(2) | R(8) | G(2) | G(1) | R(4) | G(1) |
| B(1) | G(1) | B(1) | R(2) | G(2) | R(2) | B(1) | G(1) | B(1) |

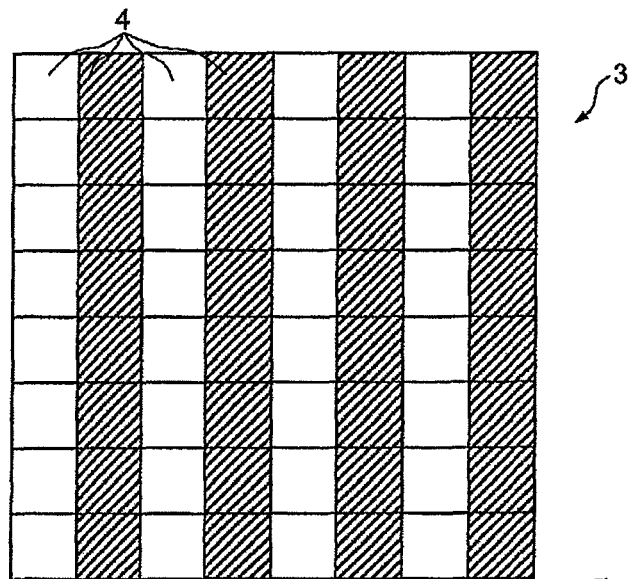
*Fig. 26a*
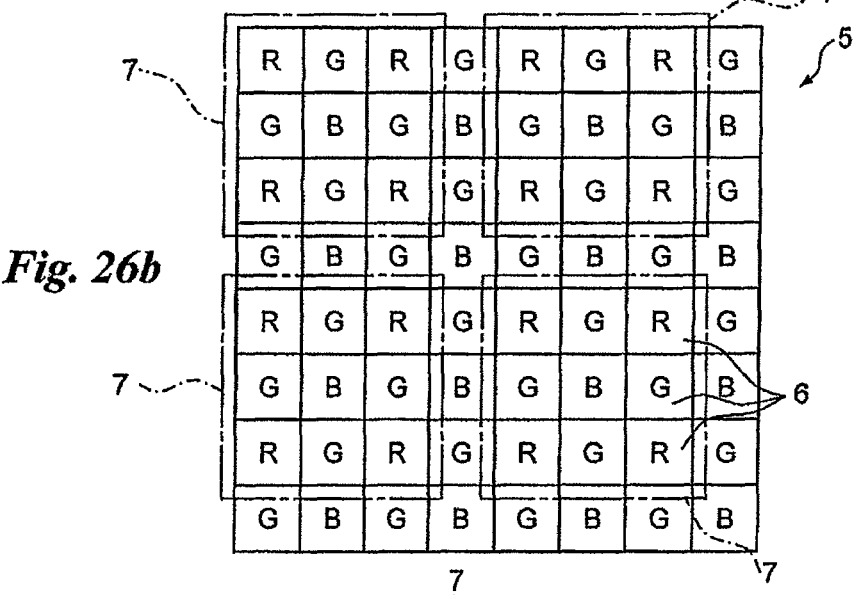
*Fig. 26b*
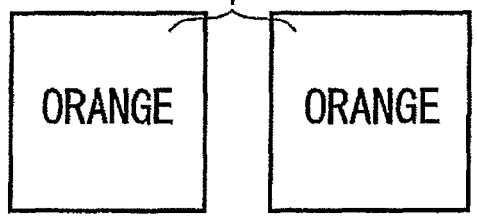
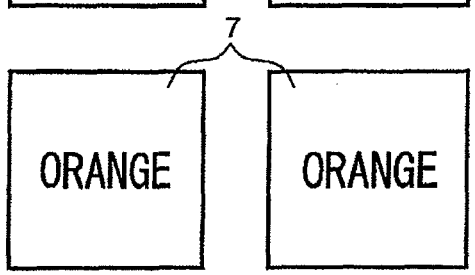
*Fig. 26c*

US 8,730,360 B2

COLOR IMAGING APPARATUS HAVING COLOR IMAGING ELEMENT, METHOD OF CONTROLLING OPERATION OF SAME AND IMAGE SENSING SYSTEM

This application is a Continuation of PCT International Application No. PCT/JP2011/067919 filed on Jul. 29, 2011, which claims priority under 35 U.S.C 119(a) to Application Nos. 2011-054684 filed in Japan on Mar. 11, 2011 and 2011-162215 filed in Japan on Jul. 25, 2011, all of which are hereby expressly incorporated by reference into the present application.

TECHNICAL FIELD

This invention relates to an image sensing apparatus, a method of controlling the operation of this apparatus and an image sensing system.

BACKGROUND ART

Figures 24A, 24B, 24C:
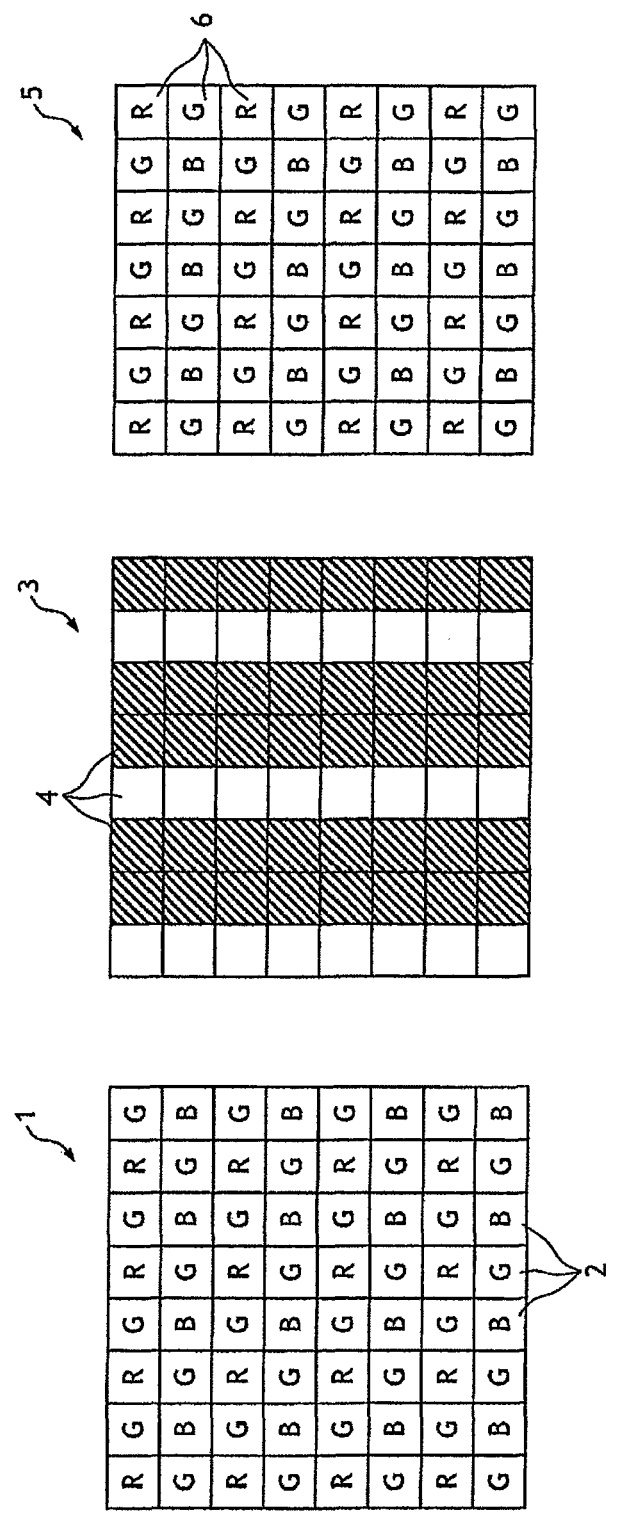

FIG. 24a illustrates part of the photoreceptor surface of a solid-state electronic image sensing device 1. The solid-state electronic image sensing device 1 is provided with a number of optoelectronic transducers 2 in the horizontal and vertical directions. Formed on the photoreceptor surfaces of the optoelectronic transducers 2 are color filters R having a characteristic that transmits a light component of the color red, color filters G having a characteristic that transmits a light component of the color green, or color filters B having a characteristic that transmits a light component of the color blue. In FIG. 24a, the color filters R, G or B are formed on the photoreceptor surfaces of the optoelectronic transducers 2 in an array referred to as the "Bayer array". FIG. 24b illustrates the manner in which an image having a period that corresponds to three columns of the optoelectronic transducers 2 of the solid-state electronic image sensing device 1 is formed on the solid-state electronic image sensing device 1. The level of the white-color portions is 255 if expressed by eight bits and the level of the portions indicated by the hatching is 0 if expressed by eight bits. If subsampling processing, which is for reading out signal charge that has accumulated in a (3n+1)th row (where n is a positive integer), is executed in a case where such an image has been formed, high-frequency components repeat and a bright, flat Moiré image is produced, as shown in FIG. 24c.

FIG. 25 illustrates one row of optoelectronic transducers of the solid-state electronic image sensing device 1 shown in FIG. 24a. Signal charge that has accumulated in optoelectronic transducers 2 on which color filters having identical characteristics have been formed are mixed along the horizontal direction.

Since every other color filter has the same characteristic, the resolution of the image after the pixels are mixed declines as if it were passed through a low-pass filter.

Furthermore, if, in a case where an image having a period that corresponds to the columns of the optoelectronic transducers 2 of the solid-state electronic image sensing device 1 is formed on the solid-state electronic image sensing device 1, as shown in FIG. 26a, signal charge is mixed every block of 3×3 pixels of the optoelectronic transducers 2, as shown in FIG. 26b, then the red level within the block will be 255 in terms of eight bits, the green level will be 128 in terms of eight bits, and the blue level will be 0, and an orange color will result (a color Moiré), as depicted in FIG. 26c.

Conventionally, the occurrence of color Moiré is suppressed by placing an optical low-pass filter in front of the photoreceptor surface of the solid-state electronic image sensing device and removing the high-frequency components of the image of the subject. However, there is a decline in resolution.

In order to deal with this, there is a technique (Japanese Patent Application Laid-Open No. 2000-308080) in which the filter array of the solid-state electronic image sensing devices is made a three-color random array that satisfies an array limit condition, namely that any pixel of interest adjoin three colors, which include the color of this pixel of interest, at any of four sides of this pixel of interest. However, it is necessary to optimize synchronization processing for every random pattern. This is troublesome. In addition, this technique is not effective in dealing with false colors ascribable to high-frequency components.

Further, there is also a sensor (Japanese Patent Application Laid-Open No. 2005-136766) having a plurality of filters of different spectral sensitivities, in which first and second filters among these are arranged alternately at a first predetermined period along one diagonal direction of an image grid and alternately at a second predetermined period only the other diagonal direction. However, the precision of pixel reproduction is not high. There is also a technique (U.S. Pat. No. 4,350,706) for applying optimum interpolation also to patterns other than horizontal and vertical edges.

Furthermore, in cases where, owing to subsampling of pixels, the amount of data is reduced and the frame rate raised, pixel interpolation processing is executed after subsampling processing and, hence, processing is inevitably complicated. In addition, false signals are produced as well.

Disclosure of the Invention

An object of the present invention is to arrange it so that processing for reducing amount of data and pixel interpolation processing can be executed simultaneously.

A further object of the present invention is to prevent the generation of false signals from an image the amount of data of which has been reduced.

An image sensing apparatus according to the present invention is characterized by comprising: a solid-state electronic image sensing device having a number of optoelectronic transducers arrayed in horizontal and vertical directions, wherein color filters having filter characteristics for transmitting a light component of any color among the three primary colors red, green and blue or a light component of any color among the three complementary colors cyan, magenta and yellow, which are the complementary colors of the three primary colors, are formed on photoreceptor surfaces of the optoelectronic transducers; in one sub-block consisting of three of the optoelectronic transducers in each of the horizontal and vertical directions, a color filter having a filter characteristic for transmitting a green or yellow component is formed on the photoreceptor surface of an optoelectronic transducer in each row and in each column; this sub-block is repeated along the horizontal and vertical directions; of first and second sub-blocks adjacent in the horizontal and vertical directions, color filters having a filter characteristic for transmitting a blue or magenta component are formed on photoreceptor surfaces of the optoelectronic transducers at positions in the second sub-block that correspond to positions of the optoelectronic transducers on which color filters having a filter characteristic for transmitting a red or cyan component are formed in the first sub-block, and in the first and second sub-blocks adjacent in the horizontal and vertical directions, color filters having a filter characteristic for transmitting a red or cyan component are formed on photoreceptor surfaces of the optoelectronic transducers at positions in the second sub-block that correspond to positions of the optoelectronic transducers on which color filters having a filter characteristic for transmitting a blue or magenta component are formed in the first sub-block; signal charge that has accumulated in the optoelectronic transducers being output as a video signal; and a first video signal mixing circuit for mixing and outputting, from among video signals that are output from the solid-state electronic image sensing device, video signals obtained based upon signal charge that has accumulated in the optoelectronic transducers on which color filters having identical filter characteristics are formed, these video signals being weighted by such weighting coefficients that levels of the video signals after the mixing thereof will be equal for every color component.

The present invention also provides an operation control method suited to the above-described image sensing apparatus. Specifically, the invention provides a method comprising: a solid-state electronic image sensing device, which has a number of optoelectronic transducers arrayed in horizontal and vertical directions, outputting signal charge, which has accumulated in the optoelectronic transducers, as a video signal, wherein color filters having filter characteristics for transmitting a light component of any color among the three primary colors red, green and blue or a light component of any color among the three complementary colors cyan, magenta and yellow, which are the complementary colors of the three primary colors, are formed on photoreceptor surfaces of the optoelectronic transducers; in one sub-block consisting of three of the optoelectronic transducers in each of the horizontal and vertical directions, a color filter having a filter characteristic for transmitting a green or yellow component is formed on the photoreceptor surface of an optoelectronic transducer in each row and in each column; this sub-block is repeated along the horizontal and vertical directions; of first and second sub-blocks adjacent in the horizontal and vertical directions, color filters having a filter characteristic for transmitting a blue or magenta component are formed on photoreceptor surfaces of the optoelectronic transducers at positions in the second sub-block that correspond to positions of the optoelectronic transducers on which color filters having a filter characteristic for transmitting a red or cyan component are formed in the first sub-block, and in the first and second sub-blocks adjacent in the horizontal and vertical directions, color filters having a filter characteristic for transmitting a red or cyan component are formed on photoreceptor surfaces of the optoelectronic transducers at positions in the second sub-block that correspond to positions of the optoelectronic transducers on which color filters having a filter characteristic for transmitting a blue or magenta component are formed in the first sub-block; and a video signal mixing circuit mixing and outputting, from among video signals that are output from the solid-state electronic image sensing device, video signals obtained based upon signal charge that has accumulated in the optoelectronic transducers on which color filters having identical filter characteristics are formed, these video signals being weighted by such weighting coefficients that levels of the video signals after the mixing thereof will be equal for every color component.

In accordance with the present invention, from among video signals that are output from a solid-state electronic image sensing device, video signals obtained based upon signal charge, which has accumulated in optoelectronic transducers on which color filters having identical filter characteristics are formed, are mixed in a first video signal mixing circuit upon being weighted by such weighting coefficients that levels of the video signals after the mixing thereof will be equal for every color component. Since the video signals are mixed, the amount of signal in the video signals is substantially reduced.

The present invention also provides an image sensing system that utilizes the above-described solid-state electronic image sensing device. Specifically, the image sensing system is characterized by comprising: the above-described image sensing apparatus; and a second video signal mixing circuit for mixing and outputting, on a per-color-component basis, video signals, which are output from the first video signal mixing circuit, using such second weighting coefficients that levels of the video signals after the mixing thereof will be equal for every color component on one line in each of the horizontal and vertical directions within one large block consisting of three of the sub-blocks in each of the horizontal and vertical directions.

In accordance with the present invention, video signals, which are output from the first video signal mixing circuit, are mixed on a per-color-component basis using such second weighting coefficients that levels of the video signals after the mixing thereof will be equal for every color component on one line in one large block in the horizontal and vertical directions thereof. In a case where the video signals are mixed, the levels of the color components of the three primary colors or three complementary colors become equal, for every color component, on one line within the one large block in the horizontal and vertical directions thereof without only specific colors becoming large in comparison with other colors. Hence the occurrence of false colors can be prevented.

In the above-described image sensing system, there is included at least one portion in which two color filters, which transmit a green or yellow light component, formed on the photoreceptor surfaces of the optoelectronic transducers contained in one medium block consisting of two of the sub-blocks in each of the horizontal and vertical directions, are contiguous along all horizontal, vertical and diagonal directions, by way of example.

Further, in the above-described image sensing system, there is included at least one portion in which two color filters each, which transmit a green or yellow light component, formed on the photoreceptor surfaces of the optoelectronic transducers contained in the medium block, are contiguous in the horizontal and vertical directions. Preferably, it is arranged so that the sub-block includes all three types of color filters having filter characteristics for transmitting light components of the above-mentioned three primary colors or three complementary colors so as to have point symmetry about a central optoelectronic transducer. In the first sub-block, a color filter having a filter characteristic for transmitting a red or cyan light component or a color filter having a filter characteristic for transmitting a blue or magenta light component may be formed on every other optoelectronic transducer in the horizontal or vertical direction.

BRIEF DESCRIPTION OF THE DRAWINGS

FIGS. 3a to 3c are examples of pixel interpolation;

FIGS. 9a to 9c are examples of pixel interpolation;

FIGS. 10a to 10c are examples of filters;

FIG. 15 shows the result of application of multiplied filter coefficients to an image;

FIG. 21 shows the result of application of multiplied filter coefficients to an image;

FIG. 24a illustrates part of the photoreceptor surface of a solid-state electronic image sensing device, and FIGS. 24b and 24c illustrate portions of images;

FIGS. 26a to 26c illustrate portions of images.

BEST MODE FOR CARRYING OUT THE INVENTION

Figure 1:
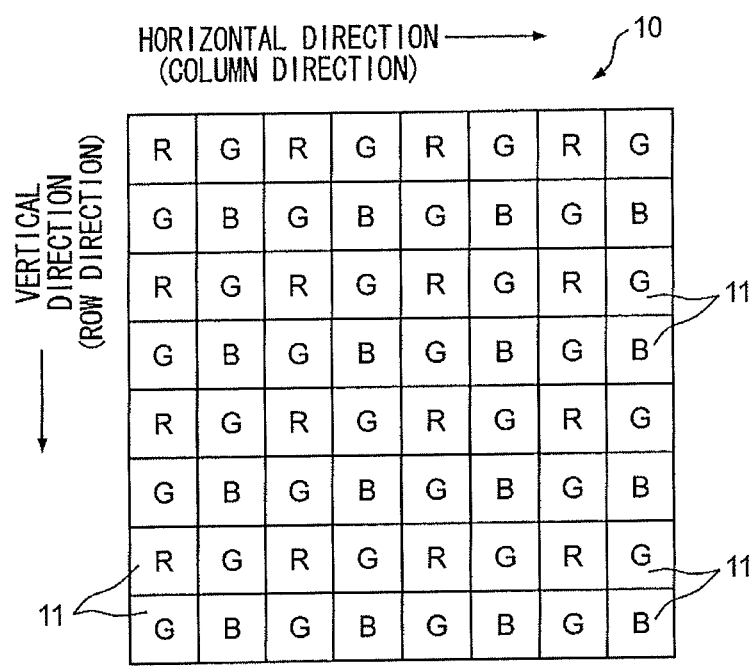
FIG. 1 illustrates part of the photoreceptor surface of a solid-state electronic image sensing device.

FIG. 1 illustrates the photoreceptor surface of a solid-state electronic image sensing device 10.

A number of optoelectronic transducers 11 are arrayed on the solid-state electronic image sensing device 10 in the horizontal and vertical directions. Formed on the photoreceptor surfaces of the optoelectronic transducers 11 are color filters having filter characteristics for transmitting light components of colors from among the three primary colors red, green and blue, these color filters being any of a red filter (indicated by character R) for transmitting a red light component, a green filter (indicated by character G) for transmitting a green light component or a blue filter (indicated by character B) for transmitting a blue light component.

The array of color filters in the solid-state electronic image sensing device 10 shown in FIG. 1 is referred to as a "Bayer array". Red filters R are formed on the photoreceptor surfaces of odd-numbered rows and odd-numbered columns, blue filters B are formed on the photoreceptor surfaces of even-numbered rows and even-numbered columns, and green filters G are formed on the photoreceptor surfaces of even-numbered rows and odd-numbered columns, and of odd-numbered rows and even-numbered columns.

Figure 2:
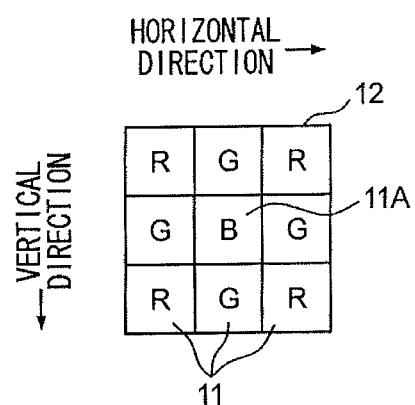
FIG. 2 illustrates part of the photoreceptor surface of a solid-state electronic image sensing device.

FIG. 2 illustrates a sub-block 12 consisting of three optoelectronic transducers 11 in each of the horizontal and vertical directions.

In the sub-block 12, a blue filter B is formed on a central optoelectronic transducer 11A. Green filters G are formed on optoelectronic transducers 11 above, below and to the left and right of the central optoelectronic transducer 11A, and red filters R are formed along the diagonal directions of the central optoelectronic transducer 11A. When consideration is given to the sub-block 12 thus consisting of three optoelectronic transducers 11 in each of the horizontal and vertical directions in a Bayer array, the color filters are formed in such a manner that the optoelectronic transducers 11 contained in the sub-block 12 include all filters, namely the red filter R, green filter G and blue filter B, and such that these color filters have point symmetry about the central optoelectronic transducer 11A. The same is true not just in a case where the color filter formed on the central optoelectronic transducer 11A is a blue filter B but also in a case where the color filter formed on the central optoelectronic transducer 11A is a red filter R or green filter G.

Signal charge representing a red light component accumulates in the optoelectronic transducers 11 on which the red filters R are formed, signal charge representing a green light component accumulates in the optoelectronic transducers 11 on which the green filters G are formed, and signal charge representing a blue light component accumulates in the optoelectronic transducers 11 on which the blue filters B are formed. A video signal representing the image of a subject is obtained by reading the accumulated signal charge out of the solid-state electronic image sensing device 10.

In the above-described example, red filters R, green filters G or blue filters B are formed on the photoreceptor surfaces of the optoelectronic transducers 11. However, a cyan filter having a characteristic for transmitting a light component of cyan C, a magenta filter having a characteristic for transmitting a light component of magenta M or a yellow filter having a characteristic for transmitting a light component of yellow Y may be formed in accordance with the Bayer array, where cyan, magenta and yellow are the complementary colors of the three primary colors.

FIGS. 3a to 3c illustrate a method of mixing pixels according to this embodiment. Mixing of pixels according to this embodiment is performed at the same time as image reduction and pixel interpolation.

FIG. 3a illustrates an image portion 13 of 3×3 pixels obtained from the optoelectronic transducers 11 that construct the sub-block 12 shown in FIG. 2. A central pixel 13A having a red component is produced using pixels obtained from the optoelectronic transducers 11, on which the red filters R are formed, from among the optoelectronic transducers 11 that construct the sub-block 12 shown in FIG. 2. As shown in FIG. 2, the color filters R are formed on the optoelectronic transducers 11 that are diagonally below and to the right, diagonally above and to the right, diagonally below and to the left and diagonally above and to the left of the central optoelectronic transducer 11A. A pixel R (the same character as that of the color filter is assigned), which represents the red component, is obtained from pixels corresponding to the optoelectronic transducers 11 on which the color filters R are formed. Since the central pixel 13A having the red component does not exist, the central pixel 13A having the red component is produced and the image portion 13 is reduced in size (to ⅓ in the horizontal and vertical directions) by mixing the pixels R, which have the red component, diagonally below and to the right, diagonally above and to the right, diagonally below and to the left and diagonally above and to the left of the central pixel 13A.

FIG. 3b also illustrates the image portion 13 of 3×3 pixels obtained from the optoelectronic transducers 11 that construct the sub-block 12 shown in FIG. 2. The central pixel 13A having a green component is produced using pixels obtained from the optoelectronic transducers 11, on which the green filters G are formed, from among the optoelectronic transducers 11 that construct the sub-block 12 shown in FIG. 2. As shown in FIG. 2, the color filters G are formed on the optoelectronic transducers 11 that are above, below and to the left and right of the central optoelectronic transducer 11A. A pixel G (the same character as that of the color filter is assigned), which represents the green component, is obtained from pixels corresponding to the optoelectronic transducers 11 on which the color filters G are formed. Since the central pixel 13A having the green component does not exist, the central pixel 13A having the green component is produced and the image portion 13 is reduced in size by mixing pixels G, which have the green component, above, below and to the left and right of the central optoelectronic transducer 13A.

FIG. 3c also illustrates the image portion 13 of 3×3 pixels obtained from the optoelectronic transducers 11 that construct the sub-block 12 shown in FIG. 2. Since the blue filter B is formed on the central optoelectronic transducer 11A, the central pixel 13A having a blue component is obtained. In this embodiment, the above-described processing is executed using all pixels of the 3×3 pixels of the sub-block 12. However, the central pixel 13A of each color component may be produced without using all of these pixels.

Figure 4A:
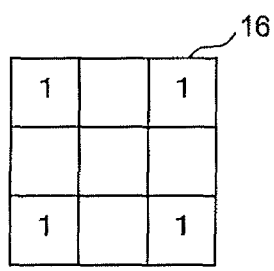
FIGS. 4a to 4c are examples of filters.
Figure 4B:
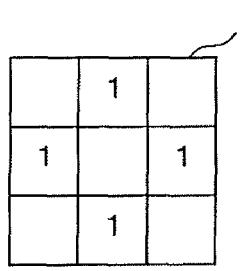
Figure 4C:
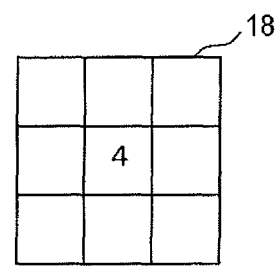

FIGS. 4a to 4c are examples of filters (digital filters) for performing pixel interpolation and size reduction by the method shown in FIGS. 3a to 3c.

FIG. 4a illustrates a filter 16 for producing the central pixel 13A having the red component as shown in FIG. 3a. The filter 16 corresponds to the image portion 13 of 3×3 pixels. Filter coefficients (weighting coefficients) by which the pixel R having the red component is multiplied have been defined. These filter coefficients are all "1". The filter coefficients at the blank locations are "0".

FIG. 4b illustrates a filter 17 for producing the central pixel 13A having the green component as shown in FIG. 3b. The filter 17 also corresponds to the image portion 13 of 3×3 pixels. Filter coefficients by which the pixel G having the green component is multiplied have been defined. These filter coefficients are all "1".

FIG. 4c illustrates a filter 18 for producing the central pixel 13A having the blue component as shown in FIG. 3c. The filter 18 also corresponds to the image portion 13 of 3×3 pixels. A filter coefficient by which the pixel B having the blue component is multiplied has been defined. This filter coefficient is "4".

Applying filter processing using the filters 16, 17 and 18 shown in FIGS. 4a, 4b and 4c to the image data representing the image portion consisting of 3×3 pixels obtained from the sub-block 12 shown in FIG. 2 is equivalent to executing the processing illustrated in FIGS. 3a, 3b and 3c (although in actuality, the values obtained by the filter processing are multiplied by ¼ in order to maintain the amount of data). Further, performing mixing in such a manner that the centroid of the weighted average of the red, green and blue components is made the position of the central pixel of the sub-block 12 is equivalent to processing for producing the pixel 13A of each color component at the position of the central pixel of the sub-block 12.

By executing the processing described above, pixel interpolation processing is executed at the same time as image reduction processing. Similar processing is executed with regard to other pixels as well and pixel interpolation processing is executed at the same time as image reduction processing with regard to one frame of an image.

Figure 5:
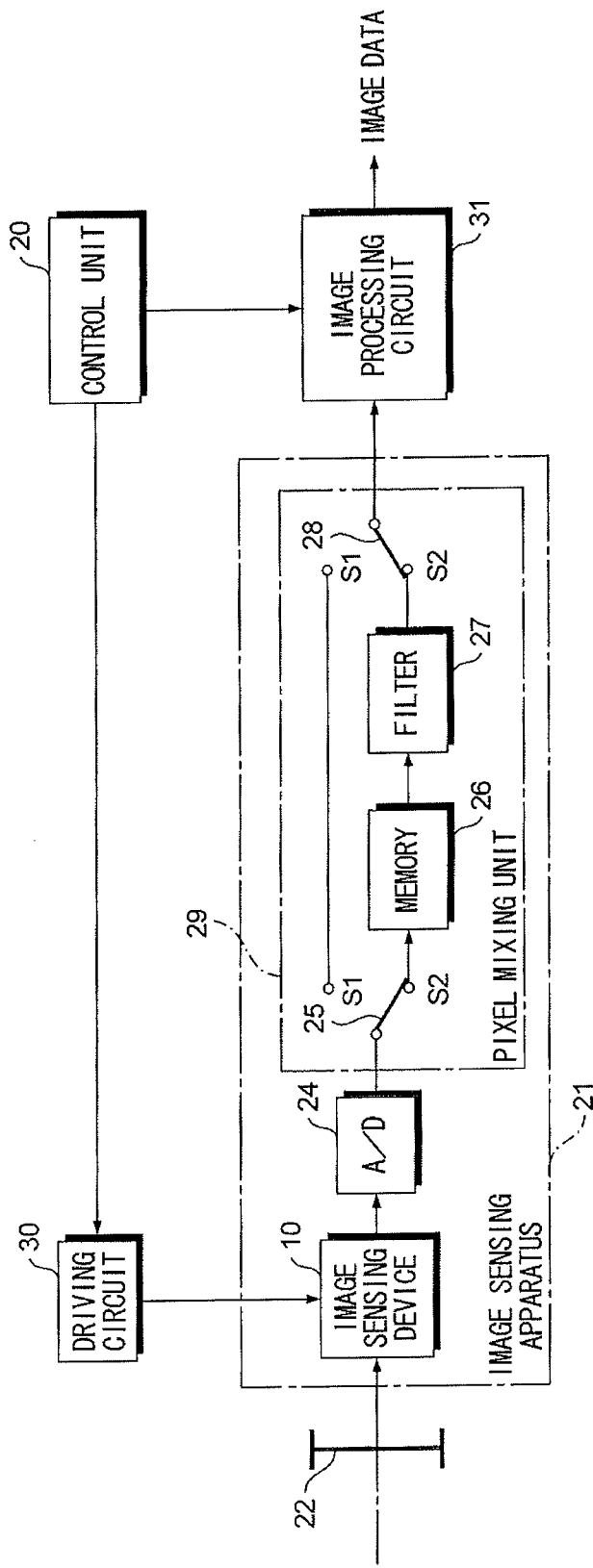
FIG. 5 is a block diagram illustrating the electrical configuration of a digital camera.

FIG. 5 is a block diagram illustrating the electrical configuration of a digital camera.

The overall operation of the digital camera is controlled by a control unit 20. The digital camera includes an image sensing apparatus 21. The image sensing apparatus 21 includes the solid-state electronic image sensing device 10 described above. The solid-state electronic image sensing device 10 is driven by a driving circuit 30.

An imaging lens 22 is provided in front of the solid-state electronic image sensing device 10 and the image of a subject is formed on the photoreceptor surface of the image sensing device 10 by the imaging lens 22. A video signal representing the image of the subject is output from the imaging device 10 and is converted to digital image data in an analog/digital conversion circuit 24. The digital image data obtained from the conversion is input to a pixel mixing unit 29. Pixel interpolation and image reduction processing are executed in the pixel mixing unit 29 in the manner set forth above.

The image data that has been input to the pixel mixing unit 29 is applied to a changeover switch 25. When a still image is recorded, the changeover switch 25 is connected to the side of an S1 terminal. In a case where image interpolation and image size reduction are carried out as set forth above (e.g., at the time of through-the-lens imaging or movie imaging), the changeover switch 25 is connected to the side of an S2 terminal.

When the changeover switch 25 is connected to the side of the S2 terminal, the image data is applied to a memory 26, where the image data is stored temporarily.

Image data representing the pixel of a red component as illustrated in FIG. 3a is read out of the memory 26 and input to a filter 27. When the image data representing the pixel of the red component is input to the filter 27, the filter coefficients of the filter 27 become as shown in FIG. 4a. Pixel interpolation and reduction processing regarding the pixel of the red component are implemented in the manner described above.

Similarly, image data representing the pixel of a green component as illustrated in FIG. 3b is read out of the memory 26 and input to a filter 27. When the image data representing the pixel of the green component is input to the filter 27, the filter coefficients of the filter 27 become as shown in FIG. 4b. Pixel interpolation and reduction processing regarding the pixel of the green component are implemented in the manner described above.

Further, image data representing the pixel of a blue component as illustrated in FIG. 3c is read out of the memory 26 and input to a filter 27. When the image data representing the pixel of the blue component is input to the filter 27, the filter coefficients of the filter 27 become as shown in FIG. 4c. Pixel interpolation and reduction processing regarding the pixel of the blue component are implemented in the manner described above.

Image data that has been output from the filter 27 is applied to an S2 terminal of a changeover switch 28. In a manner similar to that of the changeover switch 25, the changeover switch 28 also is connected to the side of an S1 terminal when a still image is recorded and is connected to the side of the S2 terminal in a case where pixel interpolation and image reduction processing are carried out (e.g., at the time of movie imaging). Image data that has been output from the filter 27 is subjected to predetermined processing in an image processing circuit 31 and is then output. Image data obtained when a still image is recorded is input to the image processing circuit 31 without undergoing processing in the pixel mixing unit 29. This image data is subjected to predetermined processing in the image processing circuit 31 and is then output.

FIGS. 6 to 17 illustrate another embodiment.

Figure 6:
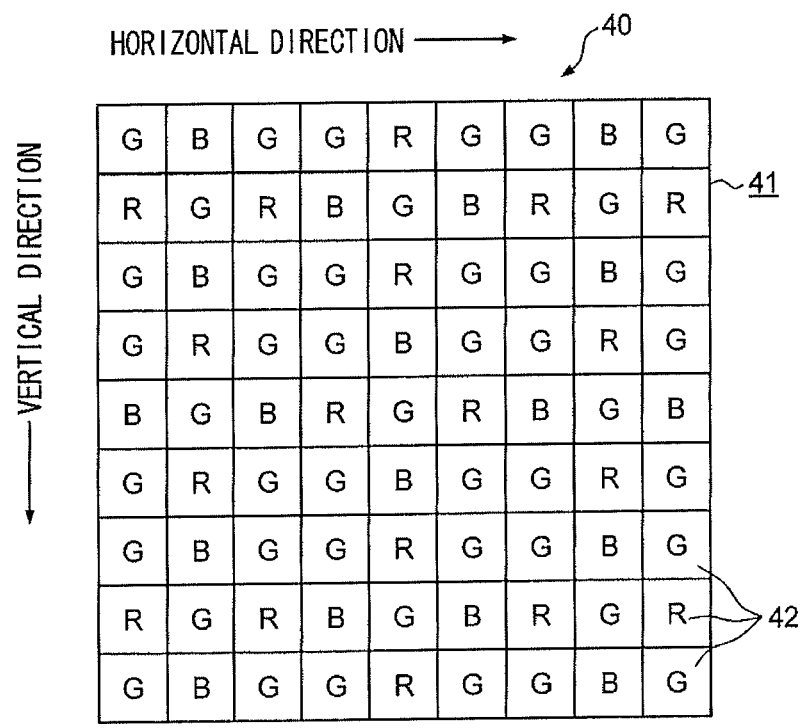
FIG. 6 illustrates part of the photoreceptor surface of a solid-state electronic image sensing device.

FIG. 6 illustrates part of the photoreceptor surface of a solid-state electronic image sensing device 40.

A number of optoelectronic transducers 41 are arrayed on the solid-state electronic image sensing device 40 in the horizontal and vertical directions. Red filters R, green filters G or blue filters B are formed on the photoreceptor surfaces of these optoelectronic transducers 41 in a manner similar to that described above.

In FIG. 6, nine optoelectronic transducers 42 have been extracted along each of the horizontal and vertical directions. A block thus composed of nine optoelectronic transducers 42 along each of the horizontal and vertical directions shall be referred to as a "large block 41". As will be described later, the large block 41 is equal to three sub-blocks each along each of the horizontal and vertical directions and is equal to nine of the sub-blocks.

Figure 7:
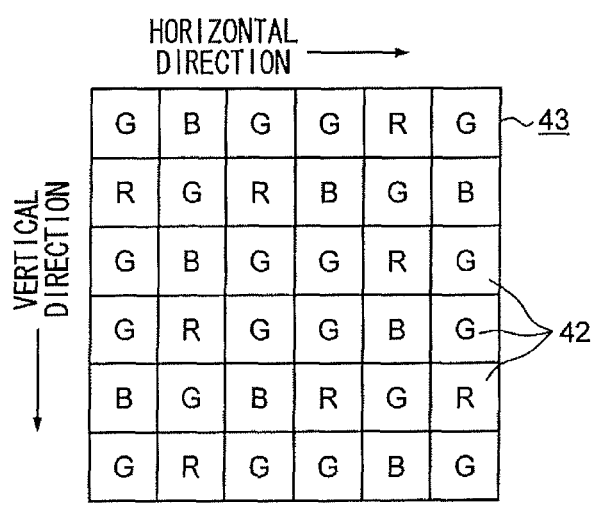
FIG. 7 illustrates part of the photoreceptor surface of a solid-state electronic image sensing device.

FIG. 7 is the result of extracting six of the optoelectronic transducers 42 along each of the horizontal and vertical directions from among the photoreceptor surfaces of the solid-state electronic image sensing device 40 shown in FIG. 6.

A block that results from the extraction of six of the optoelectronic transducers 42 along each of the horizontal and vertical directions shall be referred to as a "medium block 43". As will be described later, the medium block 43 is equal to two sub-blocks each along each of the horizontal and vertical directions and is equal to four of the sub-blocks.

In the medium block 43, at least one green filter G, one red filter R and one blue filter B each is formed in the horizontal and vertical directions. By repeatedly arraying the medium block 43, at least one green filter G is formed in each of the horizontal, vertical and diagonal directions. Further, the medium block 43 includes at least one portion in which two green filters G are contiguous in the horizontal, vertical and diagonal directions. Furthermore, the medium block 43 includes at least one portion in which two green filters G are contiguous in the horizontal and vertical directions. The array of color filters of the medium block 43 is repeated along the horizontal and vertical directions to obtain the array of color filters of the solid-state electronic image sensing device 40.

For example, in the medium block 43, the green filter G is formed in a (6 m+1)th (where m is a positive integer) column, (6 m+3)th column, (6 m+4)th column and (6 m+6)th column in a (6n+1)th (where n is a positive integer) row, (6n+3)th row, (6n+4)th row and (6n+6)th row, and in a (6 m+2)th column and (6 m+5)th column in a (6n+2)th row and (6n+5)th row. Similarly, a blue filter B is formed in a (6 m+2)th column in a (6n+1)th row and (6n+3)th row, in a (6 m+4)th column and (6 m+6)th column in a (6n+2)th row, in a (6 m+5)th column in a (6n+4)th row and (6n+6)th row, and in a (6 m+1)th column and (6 m+3)th column in a (6n+5)th row. A red filter is formed in a (6 m+5)th column in a (6n+1)th row, in a (6 m+1)th column and (6 m+3)th column in a (6n+2)th row, in a (6 m+2)th column in a (6n+4)th row and (6n+6)th row, and in a (6 m+4)th column and (6 m+6)th column in a (6n+5)th row.

Figure 8:
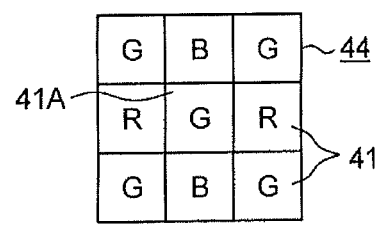
FIG. 8 illustrates part of the photoreceptor surface of a solid-state electronic image sensing device.

FIG. 8 illustrates a sub-block 44 consisting of three optoelectronic transducers 41 in each of the horizontal and vertical directions, this sub-block constituting part of the solid-state electronic image sensing device 40.

In the sub-block 44, green filters G are formed at the center and diagonally above and to the left, diagonally below and to the left, diagonally above and to the right and diagonally below and to the right of the center. Blue filters B are formed above and below the green filter G formed at the center, and red filters R are formed to the left and right of the green filter G formed at the center.

The sub-block 44, in which the blue filters B are formed above and below the green filter G formed at the center and the red filters R are formed to the left and right of the green filter G, and a sub-block, in which the positions of the blue filters B and red filters R are the opposite of those formed in the sub-block 44, are repeated alternately along the horizontal and vertical directions to obtain the array of color filters of the solid-state electronic image sensing device 40 (large blocks 41 and medium blocks 43).

In the sub-block 44 as well, color filters are formed in such a manner that the optoelectronic transducers 41 contained in the sub-block 44 include all filters, namely the red filter R, green filter G and blue filter B, and such that these color filters have point symmetry about the central optoelectronic transducer 41A.

In the above-described example, red filters R, green filters G or blue filters B are formed on the photoreceptor surfaces of the optoelectronic transducers 41. However, a cyan filter having a characteristic for transmitting a light component of cyan C, a magenta filter having a characteristic for transmitting a light component of Magenta M or a yellow filter having a characteristic for transmitting a light component of yellow Y may be formed in accordance with the Bayer array, where cyan, magenta and yellow are the complementary colors of the three primary colors.

FIGS. 9a to 9c illustrate a method of mixing pixels according to this embodiment. Mixing of pixels according to this embodiment is performed at the same time as image reduction and pixel interpolation.

FIG. 9a illustrates an image portion 45 of 3×3 pixels obtained from the optoelectronic transducers 41 that construct the sub-block 44 shown in FIG. 8. A central pixel 45A having a red component is produced using pixels obtained from the optoelectronic transducers 41, on which the red filters R are formed, from among the optoelectronic transducers 41 that construct the sub-block 44 shown in FIG. 8. As shown in FIG. 8, the color filters R are formed on the optoelectronic transducers 41 that are to the left and right of the central optoelectronic transducer 45A. A pixel R (the same character as that of the color filter is assigned), which represents the red component, is obtained from pixels corresponding to the optoelectronic transducers 41 on which the color filters R are formed. Since the central pixel 45A having the red component does not exist, the central pixel 45A having the red component is produced and the image portion 45 is reduced in size by mixing the pixels R, which have the red component, to the left and right of the central pixel 45A.

FIG. 9b also illustrates the image portion 45 of 3×3 pixels obtained from the optoelectronic transducers 41 that construct the sub-block 44 shown in FIG. 8. The central pixel 45A having a green component is produced using pixels obtained from the optoelectronic transducers 41, on which the green filters G are formed, from among the optoelectronic transducers 41 that construct the sub-block 44 shown in FIG. 8. As shown in FIG. 8, the color filters G are formed on the central optoelectronic transducer 41A and on the optoelectronic transducers 41 that are diagonally above and to the left, diagonally below and to the left, diagonally above and to the right and diagonally below and to the right of the central optoelectronic transducer 41A. A pixel G (the same character as that of the color filter is assigned), which represents the green component, is obtained from pixels corresponding to the optoelectronic transducers 41 on which the color filters G are formed. In this case also, the central pixel 45A having the green component is produced and the image portion 45 is reduced in size.

FIG. 9c also illustrates the image portion 45 of 3×3 pixels obtained from the optoelectronic transducers 41 that construct the sub-block 44 shown in FIG. 8. Since the blue filters B are formed above and below the optoelectronic transducer 41A from among the optoelectronic transducers 41 that construct the sub-block 44 shown in FIG. 8, the central pixel 45A having the blue component is produced from the pixels having the blue component above and below the central pixel 45A, as shown in FIG. 9c, and the image portion 45 is reduced in size. In this embodiment, the above-described processing is executed using all pixels of the 3×3 pixels of the sub-block 44. However, the central pixel 45A of each color component may be produced without using all of these pixels.

FIGS. 10a to 10c are examples of filters (digital filters) for performing pixel interpolation and size reduction by the method shown in FIGS. 9a to 9c.

FIG. 10a illustrates a filter 47 for producing the central pixel 45A having the red component as shown in FIG. 9a. The filter 47 corresponds to the image portion 45 of 3×3 pixels. Filter coefficients (weighting coefficients) by which the pixel R having the red component is multiplied have been defined. These filter coefficients are all "4".

FIG. 10b illustrates a filter 48 for producing the central pixel 45A having the green component as shown in FIG. 9b. The filter 48 also corresponds to the image portion 45 of 3×3 pixels. Filter coefficients by which the pixel G having the green component is multiplied have been defined. Filter coefficient by which the central pixel G is multiplied is "4", and filter coefficients by which other pixels G are multiplied are all "1".

FIG. 10c illustrates a filter 49 for producing the central pixel 45A having the blue component as shown in FIG. 9c. The filter 49 also corresponds to the image portion 45 of 3×3 pixels. A filter coefficient by which the pixel B having the blue component is multiplied has been defined. These filter coefficients are all "4".

Applying filter processing using the filters 47, 48 and 49 shown in FIGS. 10a, 10b and 10c to the image data representing the image portion consisting of 3×3 pixels obtained from the sub-block 44 shown in FIG. 8 is equivalent to executing the processing illustrated in FIGS. 9a, 9b and 9c. Further, performing mixing in such a manner that the centroid of the weighted average of the red, green and blue components is made the position of the central pixel of the sub-block 44 is equivalent to processing for producing the pixel 45A of each color component at the position of the central pixel of the sub-block 44.

By executing the processing described above, pixel interpolation processing is executed at the same time as image reduction processing. Similar processing is executed with regard to other pixels as well and pixel interpolation processing is executed at the same time as image reduction processing with regard to one frame of an image.

Figure 11:
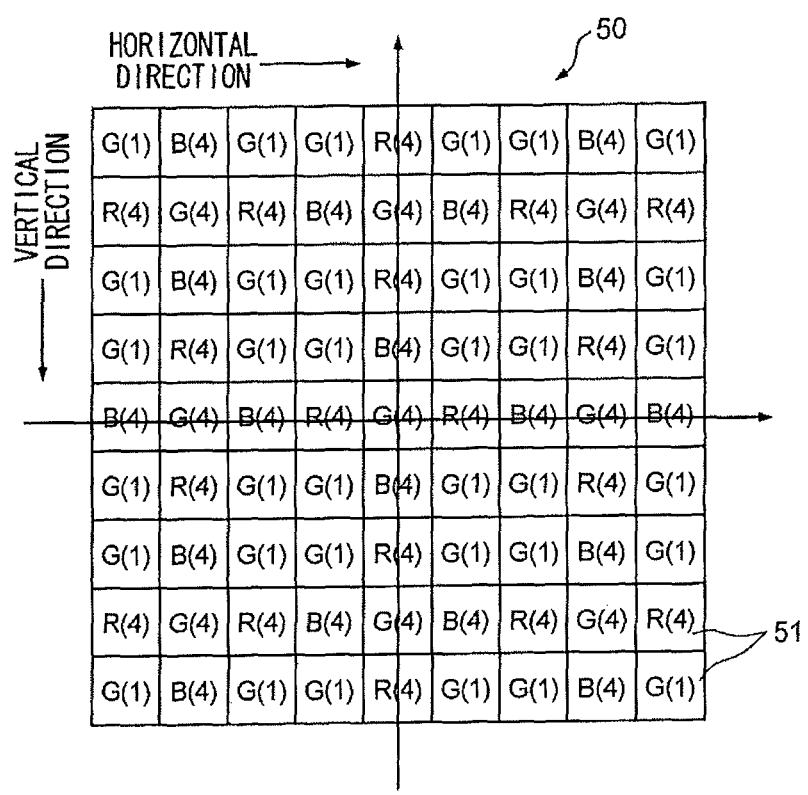
FIG. 11 shows the result of application of filter coefficients to an image.

FIG. 11 shows the result of arraying and displaying each of the filter coefficients when, using the filters 47 to 49 shown in FIGS. 10a to 10c, filter processing is applied to an image obtained by imaging a subject using the image sensing device 40 having the array of color filters shown in FIG. 6.

Characters R, G, B in FIG. 11 indicate the color components possessed by the respective pixels. The numerals within the parentheses indicate the filter coefficients the respective pixels are multiplied by. When the filter coefficients of pixels on the center line along the horizontal direction in FIG. 11 are added color component by color component, the result is 4+4=8 for the red component, 4+4+4=12 for the green component and 4+4+4+4=16 for the blue component, so that the ratio of the red, green and blue components is 2:3:4, not 1:1:1. The situation is similar with regard to the filter coefficients of pixels on the center line along the vertical direction.

Figure 12:
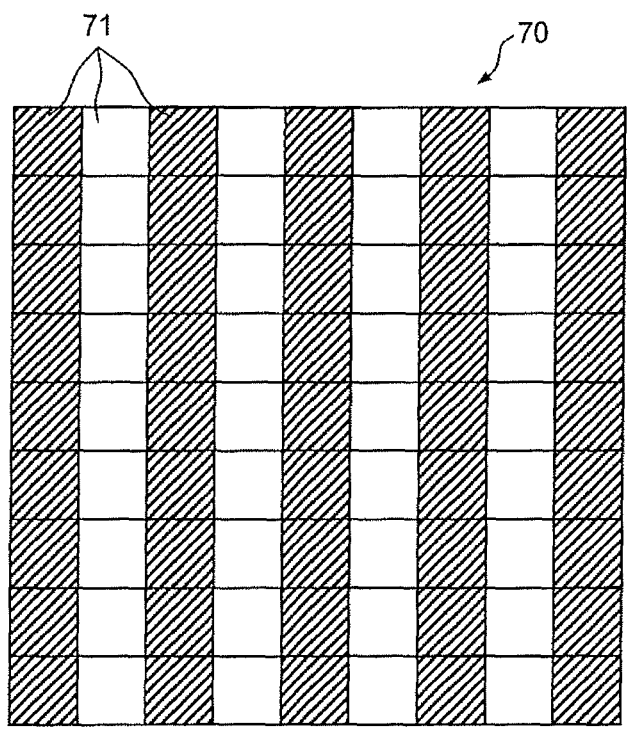
FIG. 12 illustrates a portion of an image.

FIG. 12 is an example of a subject image 70.

The subject image 70 has a resolution identical with that of the pixels along the horizontal direction of the image sensing device 40 shown in FIG. 6, and the width of each column 71 and the width of the optoelectronic transducers 41 are equal.

Figure 13:
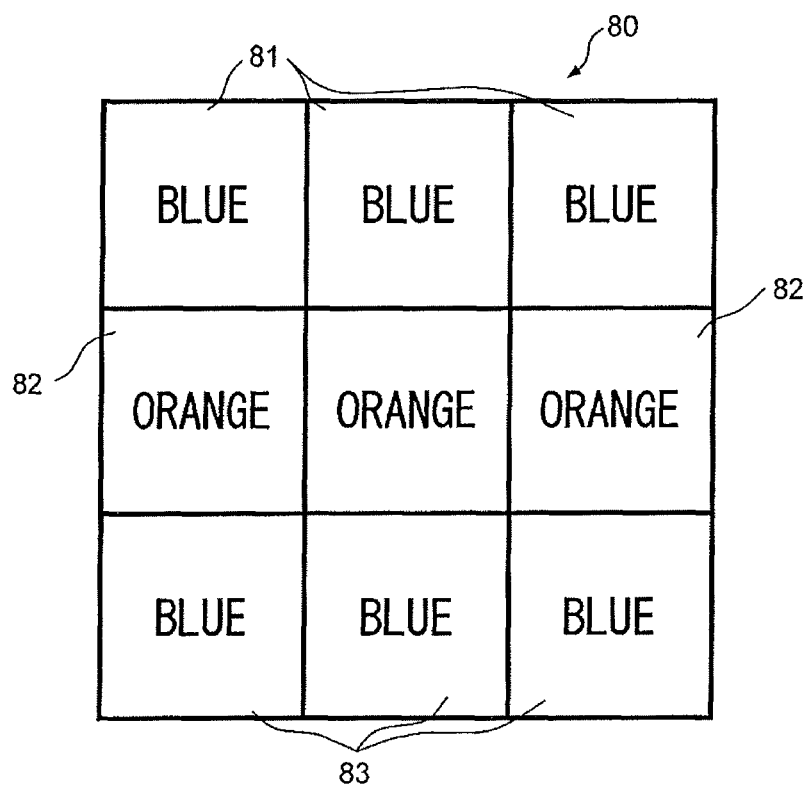
FIG. 13 illustrates a portion of an image.

When the subject image 70 shown in FIG. 12 is formed on the photoreceptor surface of the image sensing device 40 shown in FIG. 6 and filter processing is executed using the filters 47 to 49 shown in FIGS. 10a to 10c, an image 80 illustrated in FIG. 13 is the result.

With reference to FIG. 13, the image 80 contains three blocks (each consisting of 3×3 pixels) 81, 82 and 83 along each of the horizontal and vertical directions. The blocks 81 in the first row are the color blue, the blocks 82 in the second row are the color orange and the blocks 83 in the third row are the color blue. In this embodiment, further filter processing is executed in such a manner that the ratio of the red, green and blue components will be 1:1:1.

Figure 14:
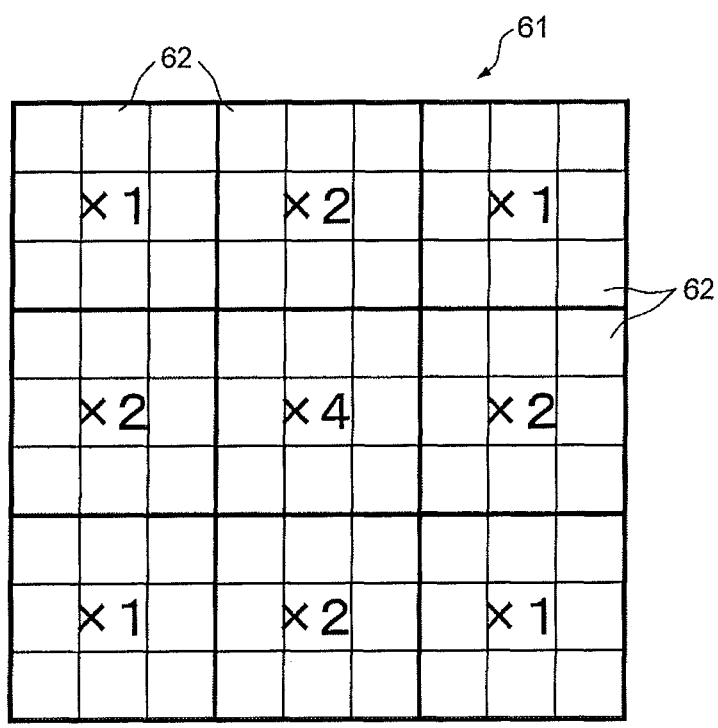
FIG. 14 is an example of a filter.

FIG. 14 is an example of a filter 61.

Filter coefficients in first to third columns and in seventh to ninth columns in first to third rows and in seventh to ninth rows are "1"; filter coefficients in fourth to sixth columns in first to third rows and in seventh to ninth rows as well as filter coefficients in first to third columns and in seventh to ninth columns in fourth to sixth rows are "2"; and filter coefficients in fourth to sixth columns in fourth to sixth rows are "4". Each block 62 is formed in correspondence with 3×3 pixels.

FIG. 15 shows the result of multiplying the filter coefficients shown in FIG. 11 by the weighting coefficients of the filter 61 shown in FIG. 14.

In FIG. 15 as well, characters R, G, B indicate the color components possessed by the respective pixels. The numerals within the parentheses indicate the filter coefficients the respective pixels are multiplied by.

FIG. 15 differs from what is shown in FIG. 11 in that, on the center lines along the horizontal and vertical directions, the sums of the filter coefficients are 16+16=32 for the red component, 8+8+16=32 for the green component and 8+8+8+8=32 for the blue component, so that the 1:1:1 relationship among the color components is maintained. As a result, the occurrence of false colors is prevented.

Figure 16:
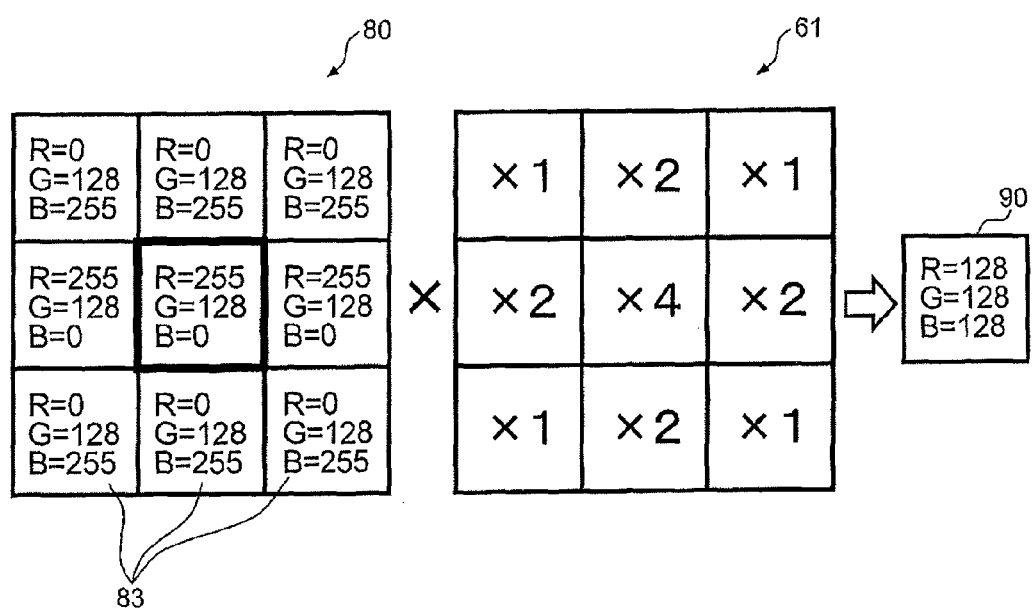
FIG. 16 illustrates filter processing.

FIG. 16 illustrates the manner in which filter processing is executed utilizing the filter 61 shown in FIG. 14.

The image 80 shown in FIG. 13, which is obtained in a case where an image is subjected to filter processing using the filters 47 to 49 shown in FIGS. 10a to 10c, is such that with regard to blocks 81 in the first row and blocks 83 in the third row, the red component is 0, the green component is 128 in 8-bit notation and the blue component is 255 in 8-bit notation. Further, with regard to blocks 82 in the second row of image 80, the red component is 255, the green component is 128 and the blue component is 0.

If such image 80 is subjected to filter processing using the filter 61, the red, green and blue components of a region at the center of blocks 82 of image 80 will be expressed by the following Equations 1 to 3, respectively:

$$\text{red component} = (0 \times 1 + 0 \times 2 + 0 \times 1 + 255 \times 2 + 255 \times 4 + 255 \times 2 + 0 \times 1 + 0 \times 2 + 0 \times 1)/16 = 128 \quad \text{Equation 1}$$

$$\text{green component} = (128 \times 1 + 128 \times 2 + 128 \times 1 + 128 \times 2 + 128 \times 4 + 128 \times 2 + 128 \times 1 + 128 \times 2 + 128 \times 1)/16 = 128 \quad \text{Equation 2}$$

$$\text{blue component} = (255 \times 1 + 255 \times 2 + 255 \times 1 + 0 \times 2 + 0 \times 4 + 0 \times 2 + 255 \times 1 + 255 \times 2 + 255 \times 1)/16 = 128 \quad \text{Equation 3}$$

As will be understood if reference is had to Equations 1 to 3, the ratio of the red, green and blue pixels is 1:1:1 and the occurrence of false colors is prevented, as indicated by a block (consisting of 3×3 pixels) 90. Such filter processing using the filter 61 is executed sequentially while moving from one neighboring region to another, and the image 80 is subjected to filter processing by repeating such processing. Processing 103 using the filter 61 differs from processing using the filter 27 in that subsampling by mixing of pixels is not carried out. When filter processing by the 3×3 filter 61 is applied to the image 80, the ratio is 1:1:1 with regard to one large pixel (90) exactly at the center of the image 80. By repeatedly executing filter processing using the 3×3 filter 61 while moving to one large pixel within an adjacent image 80, false colors are corrected. On the other hand, if the initial filter processing of FIG. 10, etc., is viewed in contrast with processing using the filter 61, it can also be said that only filter processing applied to the pixel at the center of the 3×3 pixels is executed.

The reason why the occurrence of false colors can be prevented in the foregoing embodiment will now be described.

Figure 17:
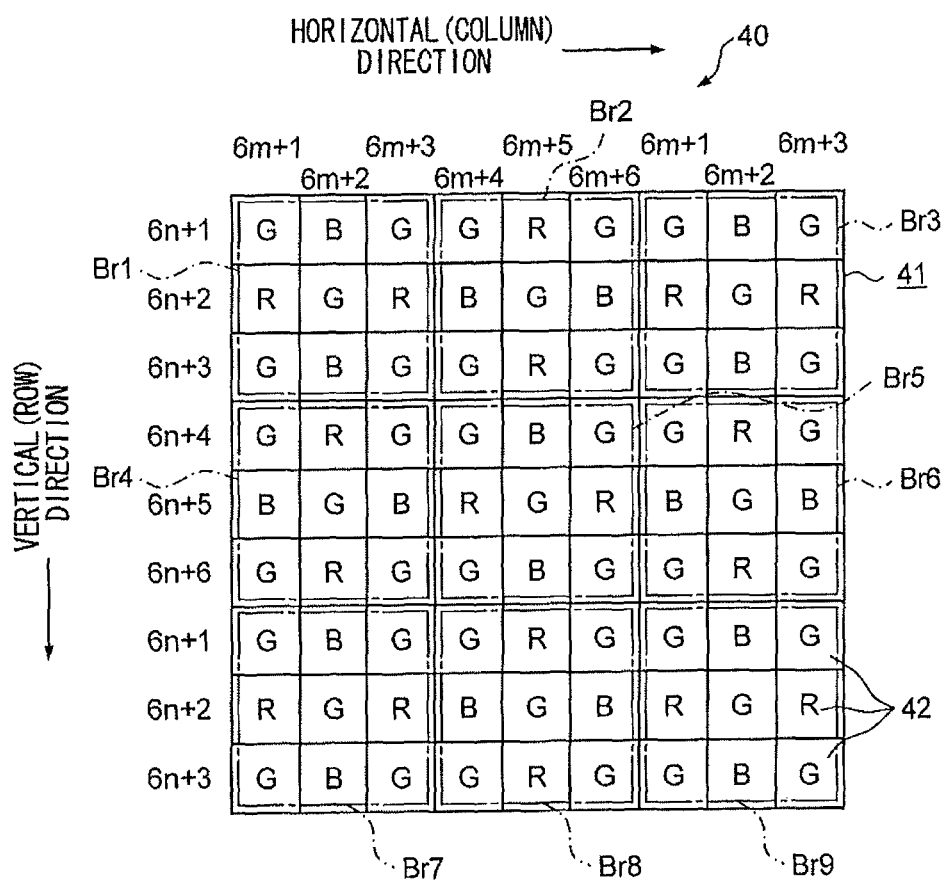
FIG. 17 illustrates part of the photoreceptor surface of a solid-state electronic image sensing device.

FIG. 17 illustrates an array of color filters of the solid-state electronic image sensing device 40 and corresponds to the solid-state electronic image sensing device shown in FIG. 6. Items shown in FIG. 17 identical with those shown in FIG. 6 have like reference characters assigned thereto.

When, as mentioned above, a subject image having a resolution identical with that of the solid-state electronic image sensing device 40 of FIG. 17 along the horizontal direction is formed, as shown in FIG. 12, on the photoreceptor surface of the solid-state electronic image sensing device 40 having the array of color filters shown in FIG. 17, the blocks 81 in the first row and the blocks 83 in the third row become blue and the blocks 82 in the second row become orange. A false color is produced.

In FIG. 17, sub-blocks Br1 and Br3 among blocks of optoelectronic transducers in (6 m+1)th to (6 m+3)th columns of (6n+1)th to (6n+3)th rows, and a sub-block Br2 of optoelectronic transducers in (6 m+4)th to (6 m+6)th columns of (6n+1)th to (6n+3)th rows, correspond to the blocks 81 in the first row shown in FIG. 13. Sub-blocks Br4 and Br6 of the optoelectronic transducers in (6 m+1)th to (6 m+3)th columns of (6n+4)th to (6n+6)th rows and a sub-block Br5 of optoelectronic transducers in (6 m+4)th to (6 m+6)th columns of (6n+4)th to (6n+6)th rows correspond to the blocks 82 in the second row shown in FIG. 13. Sub-blocks Br7 and Br9 among blocks of optoelectronic transducers in (6 m+1)th to (6 m+3)th columns of (6n+1)th to (6n+3)th rows, and a sub-block Br8 of optoelectronic transducers in (6 m+4)th to (6 m+6)th columns of (6n+1)th to (6n+3)th rows, correspond to the blocks 83 in the third row shown in FIG. 13.

In FIG. 13, the blocks 81 in the first row are blue. The reason for this is that in the sub-blocks Br1 and Br3 in the first row of FIG. 17, the level of the subject image (the subject image 70 shown in FIG. 12) in the (6 m+1)th column and (6 m+3)th column in which the filters that transmit the blue light component are formed is zero, and in the sub-block Br2 in the first row of FIG. 17, the level of the subject image in the (6 m+5)th column in which the filters that transmit the red light component are formed is zero. Further, in FIG. 13, the blocks 82 in the second row are orange. The reason for this is that in the sub-blocks Br4 and Br6 in the second row of FIG. 17, the level of the subject image (the subject image 70 shown in FIG. 12) in the (6 m+1)th column and (6 m+3)th column in which the filters that transmit the blue light component are formed is zero, and in the sub-block Br5 in the second row of FIG. 17, the level of the subject image in the (6 m+5)th column in which the filters that transmit the blue light component are formed is zero. The reason why the blocks 83 in the third row in FIG. 13 are blue is the same as the reason why the blocks 81 in the first row are blue.

In this embodiment, color filters having the filter characteristic for transmitting the green light component are formed on the photoreceptor surfaces of the optoelectronic transducers in each row and in each column in the sub-blocks Br1 to Br9. However, in the sub-blocks Br1 to Br3 and Br7 to Br9 of the odd-numbered rows, color filters having the filter characteristic for transmitting the blue light component are formed at the positions of the optoelectronic transducers at positions in the sub-blocks Br4 to Br6 of the even-numbered rows that correspond to the positions of the optoelectronic transducers on which the color filters having the filter characteristic for transmitting the red light component are formed. Similarly, in the sub-blocks Br1 to Br3 and Br7 to Br9 of the odd-numbered rows, color filters having the filter characteristic for transmitting the red light component are formed at the positions of the optoelectronic transducers at positions in the sub-blocks Br4 to Br6 of the even-numbered rows that correspond to the positions of the optoelectronic transducers on which the color filters having the filter characteristic for transmitting the blue light component are formed.

Thus, between the sub-blocks Br1 to Br3 and Br7 to Br9 of the odd-numbered rows and the sub-blocks Br4 to Br6 of the even-numbered rows, the placement of the color filters having the filter characteristic for transmitting the blue light component and the placement of the color filters having the filter characteristic for transmitting the red light component are the opposite of each other. As a consequence, a false color can be corrected for, based upon video signals obtained from adjacent sub-blocks, by filter processing of the kind shown in FIG. 14. At such time the filter coefficients of FIG. 14 are set in such a manner that the ratio of the sums of the coefficients of the red, green and blue component shown in FIG. 15 will be 1:1:1.

Further, the array of color filters according to this embodiment can be expressed by alternately repeating a so-called A array and B array along the horizontal and vertical directions.

Specifically, in the case of the so-called A array (e.g., sub-block Br1), in each of the sub-blocks Br1 to Br9 shown in FIG. 17, color filters having the filter characteristic for transmitting the green light component are formed at the center and at the four corners, and as shown in sub-block Br1, color filters having the filter characteristic for transmitting the red light component are formed at both ends of the center row [(6n+2)th row] and color filters having the filter characteristic for transmitting the blue light component are formed at both ends of the center column [(6 m+2)th column]. In the case of the so-called B array (e.g., sub-blocks Br4, Br2), in each of the sub-blocks Br1 to Br9, color filters having the filter characteristic for transmitting the green light component are formed at the center and at the four corners in a manner similar to that of the A array. However, as shown in sub-block Br4 (or sub-block Br2), color filters having the filter characteristic for transmitting the blue light component are formed at both ends of the center row [(6n+5)th row or (6n+2)th row] on which the color filters having the filter characteristic for transmitting the red light component are formed in the sub-block Br1, and color filters having the filter characteristic for transmitting the red light component are formed at both ends of the center column [(6 m+2)th column or (6 m+5)th column] on which the color filters having the filter characteristic for transmitting the blue light component are formed in the sub-block Br1.

Color filters having the filter characteristic for transmitting the red light component in the sub-blocks Br4 to Br6 of the even-numbered rows are formed on the photoreceptor surfaces of optoelectronic transducers on which color filters having the filter characteristic for transmitting the red light component are not formed in the sub-blocks Br1 to Br3 and Br7 to Br9 of the odd-numbered rows. Color filters having the filter characteristic for transmitting the blue light component in the sub-blocks Br1 to Br3 and Br7 to Br9 of the odd-numbered rows are formed on the photoreceptor surfaces of optoelectronic transducers on which color filters having the filter characteristic for transmitting the blue light component are not formed in the sub-blocks Br4 to Br6 of the even-numbered rows. Accordingly, even in a case where a subject image having a resolution the same as that in the horizontal direction of the image sensing device 40 of FIG. 12 is formed, a false color can be corrected for, based upon video signals obtained from adjacent sub-blocks, by filter processing of the kind shown in FIG. 14. At such time the filter coefficients are set appropriate, as mentioned above.

Thus, in the sub-block Br1, color filters having the filter characteristic for transmitting the red light component are formed on the photoreceptor surfaces of every other optoelectronic transducer in the horizontal or vertical direction. In sub-block Br4 adjacent to sub-block Br1 in the vertical direction (in sub-block Br2 adjacent in the horizontal direction), color filters having the filter characteristic for transmitting the blue light component are formed on the photoreceptor surfaces of optoelectronic transducers at positions that correspond to the positions at which the color filters having the filter characteristic for transmitting the red light component are formed in sub-block Br1.

Further, with the Bayer array, color filters having the filter characteristic for transmitting the red light component and color filters having the filter characteristic for transmitting the blue light component are arrayed every other pixel along the horizontal direction, and color filters having the filter characteristic for transmitting the red light component or color filters having the filter characteristic for transmitting the blue light component do not exist in the same column and same row. Therefore, only the orange false color is produced, as shown in FIG. 26c. Since the blue light component does not exist in adjacent blocks as well, the false color cannot be corrected for in the manner set forth above even though the filter processing shown in FIG. 14 is executed.

By contrast, with the array of color filters according to this embodiment, since at least one color filter having a filter characteristic for transmitting a green component, one color filter having a filter characteristic for transmitting a blue component and one color filter having a filter characteristic for transmitting a red component are formed in all of the horizontal and vertical directions in an medium block (the basic array pattern), a false color can be corrected for, based upon video signals from adjacent sub-blocks, by filter processing. It goes without saying that when this is performed, filter coefficients are set as the filter coefficient values in such a manner that the ratio of the sums of the coefficients of the red, green and blue components will be 1:1:1.

FIGS. 18 to 22 illustrate another embodiment.

Figure 18:
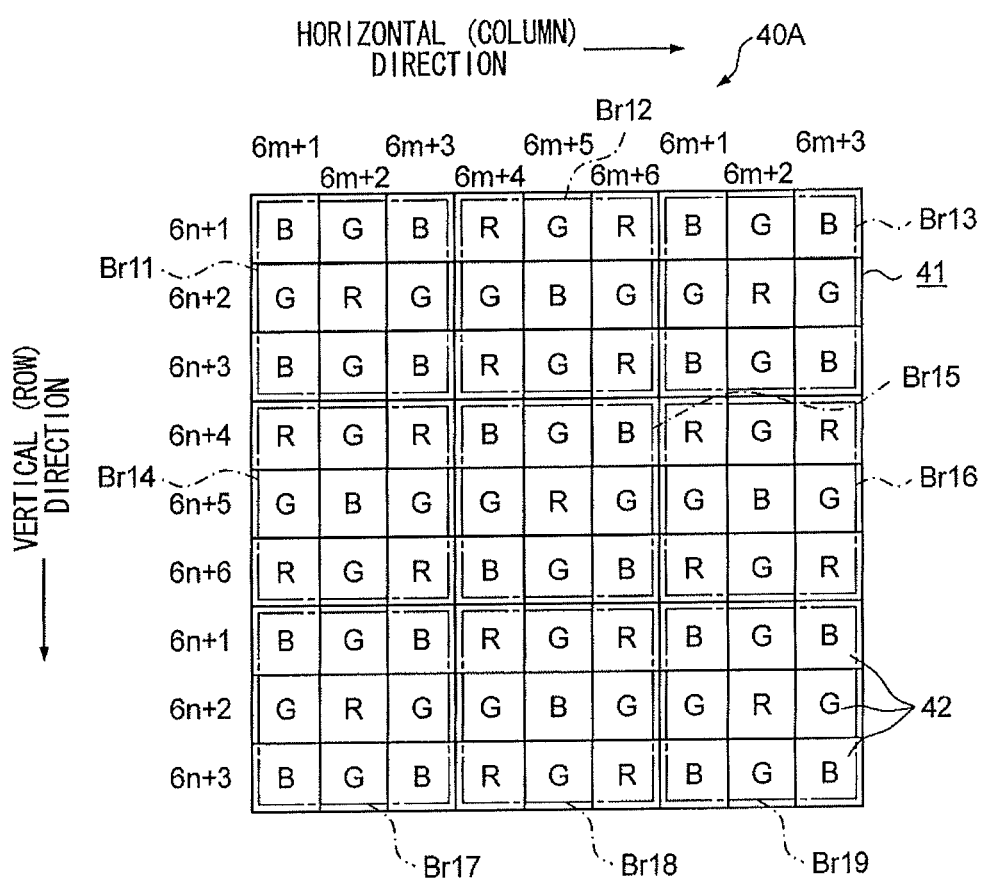
FIG. 18 illustrates part of the photoreceptor surface of a solid-state electronic image sensing device.

FIG. 18, which illustrates part of the photoreceptor surface of a solid-state electronic image sensing device 40A, corresponds to FIG. 6.

A number of optoelectronic transducers 41 are arrayed in the solid-state electronic image sensing device 40A in the horizontal and vertical directions. Red filters R, green filters G or blue filters B are formed on the photoreceptor surfaces of the optoelectronic transducers 41 in a manner similar to that set forth above. The filter array of the solid-state electronic image sensing device 40A shown in FIG. 18 differs from the filter array of the solid-state electronic image sensing device 40 shown in FIG. 6.

In the solid-state electronic image sensing device 40A illustrated in FIG. 18, nine of the optoelectronic transducers 42 (large block 41) are extracted in each of the horizontal and vertical directions in a manner similar to that of the solid-state electronic image sensing device 40 illustrated in FIG. 6. As mentioned above, the large block 41 is equal to nine sub-blocks Br11 to Br19 each composed of three of the optoelectronic transducers 42 in each of the horizontal and vertical directions.

In each of the sub-blocks Br11 to Br19, green filters G for transmitting the green light component are formed on the photoreceptor surfaces of the optoelectronic transducers 42 above and below and to the left and right of the central optoelectronic transducer 42. A red filter R for transmitting the red light component or a blue filter B for transmitting the blue light component is formed on the photoreceptor surface of the central optoelectronic transducer. In a case where the red filter R is formed on the photoreceptor surface of the central optoelectronic transducer 42, the blue filters B are formed on the photoreceptor surfaces of the optoelectronic transducers 42 at the four corners, and in a case where the blue filter B is formed on the photoreceptor surface of the central optoelectronic transducer 42, the red filters R are formed on the photoreceptor surfaces of the optoelectronic transducers 42 at the four corners.

Further, in the sub-blocks Br11 to Br19 that are adjacent above and below or at the left and right, the filter formed on the central optoelectronic transducer 42 and the filters formed on the optoelectronic transducers 42 at the four corners are different. For example, the red filter R is formed on the central optoelectronic transducer 42 of the sub-block Br11 at the upper left in FIG. 18, and the blue filters B are formed on the optoelectronic transducers 42 at the four corners. However, the blue filter B is formed on the central optoelectronic transducer 42 of sub-block Br12 and sub-block Br14 adjacent to the right of the sub-block Br11 and below the sub-block Br11, and the red filters R are formed on the optoelectronic transducers 42 at the four corners. Thus, the blue filter B (or red filter R) is formed on the photoreceptor surface of the optoelectronic transducer 42 at positions in the sub-blocks Br12 and Br14 that correspond to the position of the optoelectronic transducer 42 on which the red filter R (or blue filter B) is formed in the sub-block Br11. A similar relationship holds also with regard to the other sub-blocks and not just the sub-block Br11, sub-block Br12 and sub-block Br14.

Although only the large block 41 comprising nine sub-blocks Br11 to Br19 is illustrated in FIG. 18. However, it goes without saying that such sub-blocks are repeated along the horizontal and vertical directions.

In the above-described example, red filters R, green filters G or blue filters B are formed on the photoreceptor surfaces of the optoelectronic transducers 11. However, cyan filters having a characteristic for transmitting the cyan C light component, magenta filters having a characteristic for transmitting the magenta M light component and yellow filters having a characteristic for transmitting the yellow Y light component, where cyan, magenta and yellow are the complementary colors of the three primary colors, may be formed on the photoreceptor surfaces.

It will suffice if mixing of the pixels in the solid-state electronic image sensing device 40A shown in FIG. 18 is performed based upon FIGS. 3a to 3c. It will be understood that image reduction and pixel interpolation are carried out simultaneously in a manner similar to that set forth above. Further, it will suffice if such mixing of pixels utilizes digital filters 16 to 18 illustrated in FIGS. 4a to 4c.

Figure 19:
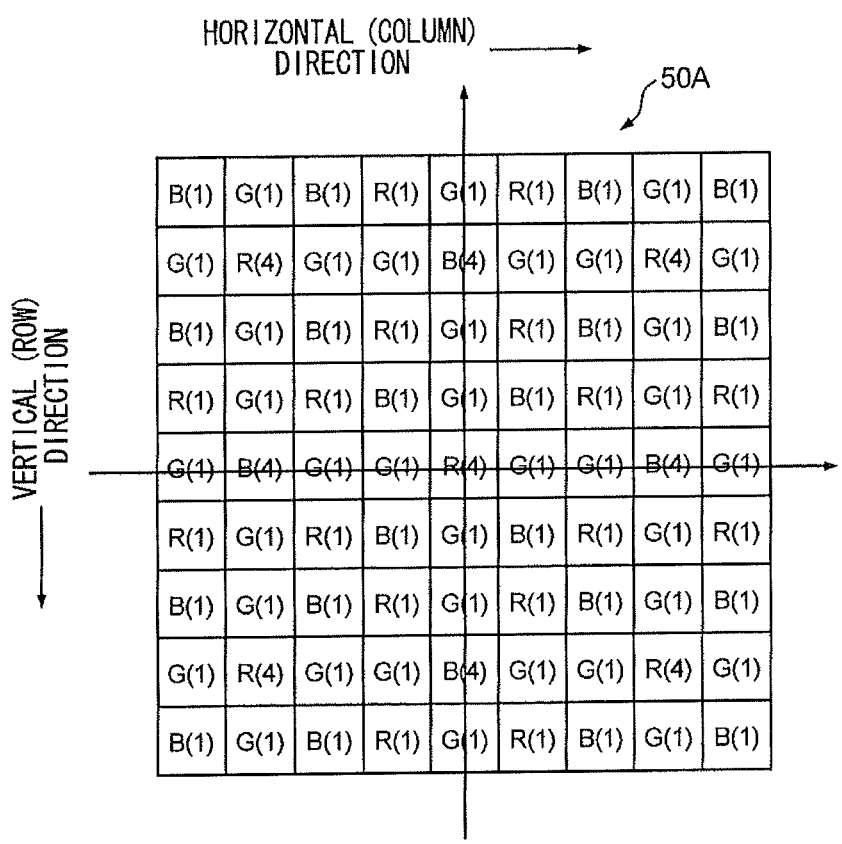
FIG. 19 shows the result of application of filter coefficients to an image.

FIG. 19 shows the result of arraying and displaying each of the filter coefficients when, using the filters 16 to 18 shown in FIGS. 4a to 4c, filter processing is applied to an image 50A obtained by imaging a subject using the solid-state electronic image sensing device 40A having the array of color filters shown in FIG. 18. FIG. 19 corresponds to FIG. 11.

Characters R, G, B in FIG. 19 indicate the color components possessed by the respective pixels. The numerals within the parentheses indicate the filter coefficients the respective pixels are multiplied by. When the filter coefficients of pixels on the center line along the horizontal direction in FIG. 19 are added color component by color component, the result is 4 for the red component, 1+1+1+1=4 for the green component and 4+4=8 for the blue component, so that the ratio of the red, green and blue components is 1:1:2, not 1:1:1. The situation is similar with regard to the filter coefficients of pixels on the center line along the vertical direction.

Figure 20:
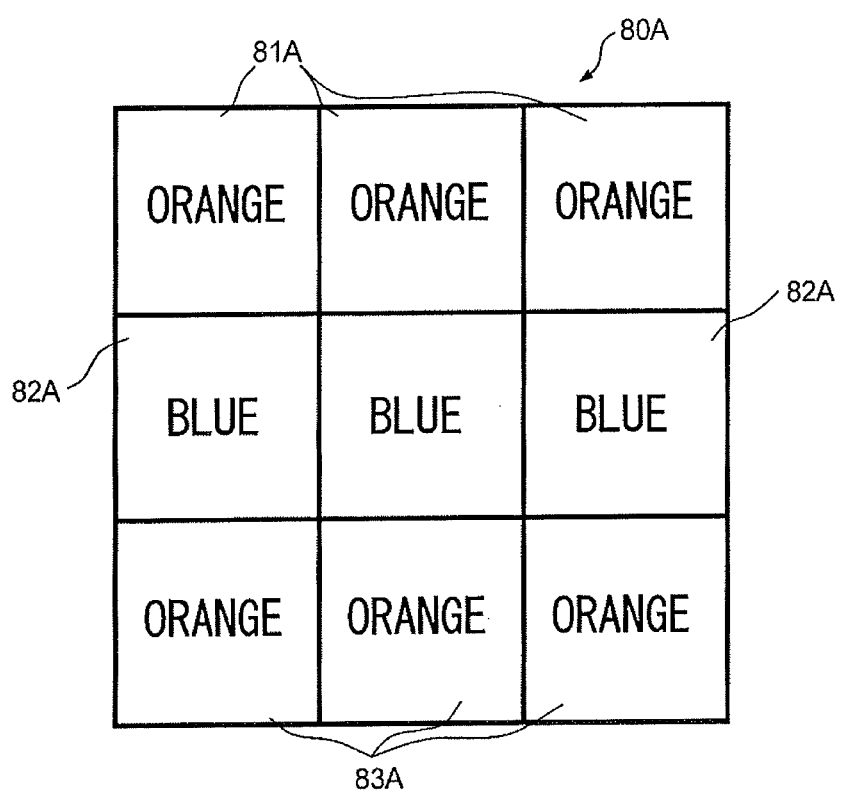
FIG. 20 illustrates a portion of an image.

When, in a manner similar to that described above, the subject image 70 shown in FIG. 12 is formed on the photoreceptor surface of the image sensing device 40A shown in FIG. 18 and filter processing is executed using the filters 16 to 18 shown in FIGS. 4a to 4c, an image 80A illustrated in FIG. 20 is the result.

With reference to FIG. 20, the image 80A contains three blocks (each consisting of 3×3 pixels) 81A, 82A and 83A along each of the horizontal and vertical directions. The blocks 81A in the first row are the color orange, the blocks 82 in the second row are the color blue and the blocks 83 in the third row are the color orange. In this embodiment as well, further filter processing is executed in such a manner that the ratio of the red, green and blue components will be 1:1:1.

FIG. 21 shows the result of multiplying the filter coefficients shown in FIG. 19 by the weighting coefficients of the filter 61 shown in FIG. 14.

In FIG. 21 as well, characters R, G, B indicate the color components possessed by the respective pixels in a manner similar to FIG. 19. The numerals within the parentheses indicate the filter coefficients the respective pixels are multiplied by.

FIG. 21 differs from what is shown in FIG. 19 in that, on the center lines along the horizontal and vertical directions, the sums of the filter coefficients are 16 for the red component, 2+2+4+4+2+2=16 for the green component and 8+8=16 for the blue component, so that the 1:1:1 relationship among the color components is maintained.

Figure 22:
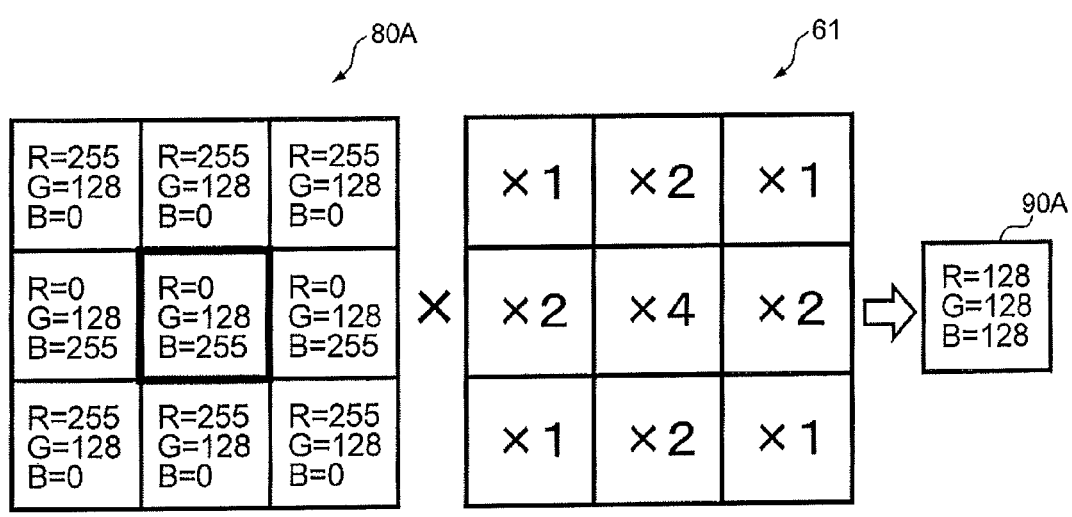
FIG. 22 illustrates filter processing.

FIG. 22, which illustrates the manner in which filter processing is executed utilizing the filter 61 shown in FIG. 14, corresponds to FIG. 16.

The image 80A shown in FIG. 20 is such that with regard to blocks 81A in the first row and blocks 83A in the third row, the red component is 255, the green component is 128 in 8-bit notation and the blue component is 0 in 8-bit notation. Further, with regard to blocks 82A in the second row of image 80A, the red component is 0, the green component is 128 and the blue component is 255.

If such image 80A is subjected to filter processing using the filter 61, the red, green and blue components of a region at the center of blocks 82A of image 80A will be expressed by the following Equations 4 to 6, respectively:

$$\text{red component} = (255 \times 1 + 255 \times 2 + 255 \times 1 + 0 \times 2 + 0 \times 4 + 0 \times 2 + 255 \times 1 + 255 \times 2 + 255 \times 1)/16 = 128 \quad \text{Equation 4}$$

$$\text{green component} = (128 \times 1 + 128 \times 2 + 128 \times 1 + 128 \times 2 + 128 \times 4 + 128 \times 2 + 128 \times 1 + 128 \times 2 + 128 \times 1)/16 = 128 \quad \text{Equation 5}$$

$$\text{blue component} = (0 \times 1 + 0 \times 2 + 0 \times 1 + 255 \times 2 + 255 \times 4 + 252 \times 2 + 0 \times 1 + 0 \times 2 + 0 \times 1)/16 = 128 \quad \text{Equation 6}$$

As will be understood if reference is had to Equations 4 to 6, the ratio of the red, green and blue pixels is 1:1:1 and the occurrence of false colors is prevented, as indicated by a block (consisting of 3×3 pixels) 90A. Such filter processing using the filter 61 is executed sequentially while moving from one neighboring region to another, and the image 80A is subjected to filter processing by repeating such processing.

Figure 23:
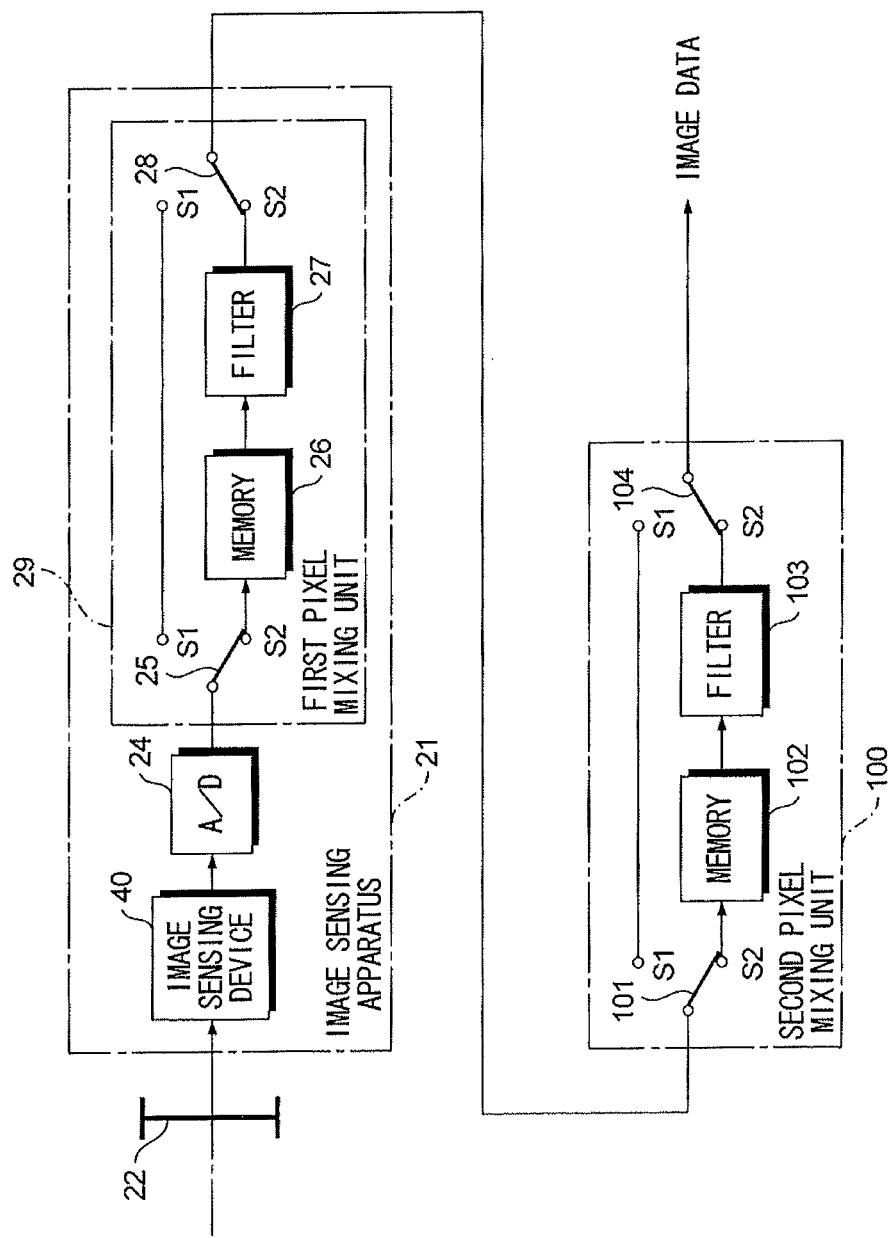
FIG. 23 is a block diagram illustrating the electrical configuration of a digital camera.
Figure 25:
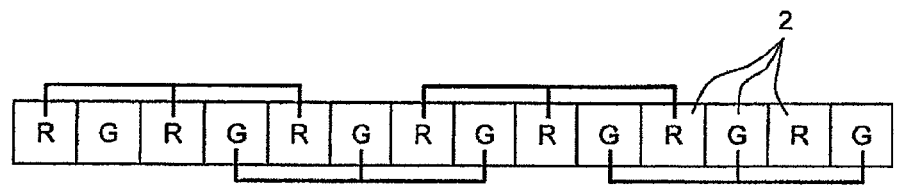
FIG. 25 illustrates a mixture of pixels.

FIG. 23 is a block diagram illustrating the electrical configuration of a digital camera. Items shown in FIG. 23 identical with those shown in FIG. 5 have like reference characters assigned thereto and need not be described again.

The image sensing device 40 utilized is one having the array of color filters shown in FIG. 6. First filter processing described with reference to FIGS. 9a to 9c and FIGS. 10a to 10c is executed in the pixel mixing unit (first pixel mixing unit) 29 in the manner set forth above. Image data that has been subjected for first filter processing is input to a second pixel mixing unit 100.

The image data that has been input to the second pixel mixing unit 100 is applied to a changeover switch 101. In a manner similar to the changeover switches 25 and 28, the second pixel mixing unit 100 is connected to an S2 terminal in a case where the above-described filter processing or the like is executed and to an S1 terminal when filter processing is not executed in response to a user command or the like. Operation is similar also for a changeover switch 104 described below.

When the changeover switch 101 is connected to the S2 terminal and image data is input to a memory 101, the input image data is stored in the memory 102 temporarily. Image data is read out of the memory 102 and is subjected to filter processing in a filter 103 having the filter coefficients shown in FIG. 14. Image data is output from the filter 103 via the changeover switch 104. The image data thus output is such that occurrence of false colors is prevented. It should be noted that although the foregoing embodiment illustrates an example in which the above-described pixel mixing processing is applied to digital image data obtained by an analog/digital conversion of a video signal that has been output from an image sensing device, it may be arranged so that, in a case where a CMOS is used as the image sensing device, the above-described pixel mixing processing is executed when the video signal is read out of the image sensing device.

The invention claimed is:

1. An image sensing apparatus comprising:
a solid-state electronic image sensing device having a number of optoelectronic transducers arrayed in horizontal and vertical directions, wherein color filters having filter characteristics for transmitting a light component of any color among the three primary colors red, green and blue or a light component of any color among the three complementary colors cyan, magenta and yellow, which are the complementary colors of the three primary colors, are formed on photoreceptor surfaces of the optoelectronic transducers; in one sub-block consisting of three of said optoelectronic transducers in each of the horizontal and vertical directions, a color filter having a filter characteristic for transmitting a green or yellow component is formed on the photoreceptor surface of an optoelectronic transducer in each row and in each column; this sub-block is repeated along the horizontal and vertical directions; of first and second sub-blocks adjacent in the horizontal and vertical directions, color filters having a filter characteristic for transmitting a blue or magenta component are formed on photoreceptor surfaces of said optoelectronic transducers at positions in said second sub-block that correspond to positions of said optoelectronic transducers on which color filters having a filter characteristic for transmitting a red or cyan component are formed in said first sub-block, and in the first and second sub-blocks adjacent in the horizontal and vertical directions, color filters having a filter characteristic for transmitting a red or cyan component are formed on photoreceptor surfaces of said optoelectronic transducers at positions in said second sub-block that correspond to positions of said optoelectronic transducers on which color filters having a filter characteristic for transmitting a blue or magenta component are formed in the first sub-block; signal charge that has accumulated in said optoelectronic transducers being output as a video signal; and a first video signal mixing circuit for mixing and outputting, from among video signals that are output from said solid-state electronic image sensing device, video signals obtained based upon signal charge that has accumulated in said optoelectronic transducers on which color filters having identical filter characteristics are formed, these video signals being weighted by such weighting coefficients that levels of the video signals after the mixing thereof will be equal for every color component.

2. An image sensing system according to claim 1, wherein said sub-block includes all three types of color filters having filter characteristics for transmitting light components of said three primary colors or of said three complementary colors so as to have point symmetry about a central optoelectronic transducer.

3. An image sensing system according to claim 1, wherein in said first sub-block, a color filter having a filter characteristic for transmitting a red or cyan light component or a color filter having a filter characteristic for transmitting a blue or magenta light component is formed on every other optoelectronic transducer in the horizontal or vertical direction.

4. An image sensing system comprising:
an image sensing apparatus set forth in claim 1; and
a second video signal mixing circuit for mixing and outputting, on a per-color-component basis, video signals, which are output from said first video signal mixing circuit, using such second weighting coefficients that levels of the video signals after the mixing thereof will be equal for every color component on one line in each of the horizontal and vertical directions within one large block consisting of three of said sub-blocks in each of the horizontal and vertical directions.

5. An image sensing system according to claim 4, wherein there is included at least one portion in which two color filters, which transmit a green or yellow light component, formed on the photoreceptor surfaces of optoelectronic transducers contained in one medium block consisting of two of said sub-blocks in each of the horizontal and vertical directions, are contiguous along all horizontal, vertical and diagonal directions.

6. An image sensing system according to claim 5, wherein there is included at least one portion in which two color filters each, which transmit a green or yellow light component, formed on the photoreceptor surfaces of optoelectronic transducers contained in said medium block, are contiguous in the horizontal and vertical directions.

7. A method of image processing, comprising:

receiving video signals output from a solid-state electronic image sensing device, which has a number of optoelectronic transducers arrayed in horizontal and vertical directions which accumulate signal charge in the optoelectronic transducers, wherein the solid-state electronic image sensing device has color filters having filter characteristics for transmitting a light component of any color among the three primary colors red, green and blue or a light component of any color among the three complementary colors cyan, magenta and yellow, which are the complementary colors of the three primary colors, which are formed on photoreceptor surfaces of the optoelectronic transducers; in one sub-block consisting of three of the optoelectronic transducers in each of the horizontal and vertical directions, a color filter having a filter characteristic for transmitting a green or yellow component being formed on the photoreceptor surface of an optoelectronic transducer in each row and in each column; this sub-block being repeated along the horizontal and vertical directions; of first and second sub-blocks adjacent in the horizontal and vertical directions, color filters having a filter characteristic for transmitting a blue or magenta component being formed on photoreceptor surfaces of the optoelectronic transducers at positions in the second sub-block that correspond to positions of the optoelectronic transducers on which color filters having a filter characteristic for transmitting a red or cyan component are formed in the first sub-block, and in the first and second sub-blocks adjacent in the horizontal and vertical directions, color filters having a filter characteristic for transmitting a red or cyan component being formed on photoreceptor surfaces of the optoelectronic transducers at positions in the second sub-block that correspond to positions of the optoelectronic transducers on which color filters having a filter characteristic for transmitting a blue or magenta component are formed in the first sub-block; and mixing video signals obtained based upon signal charge that has accumulated in the optoelectronic transducers on which color filters having identical filter characteristics are formed, wherein the video signals are weighted and mixed by such weighting coefficients that levels of the video signals after the mixing thereof will be equal for every color component.

* * * * *